(12) United States Patent
Jungreis

(10) Patent No.: US 7,831,401 B2
(45) Date of Patent: Nov. 9, 2010

(54) POWER OUTAGE DETECTION IN A SWITCHED MODE POWER SUPPLY

(75) Inventor: Aaron Jungreis, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 223 days.

(21) Appl. No.: 11/839,411

(22) Filed: Aug. 15, 2007

(65) Prior Publication Data

US 2008/0046204 A1  Feb. 21, 2008

Related U.S. Application Data

(60) Provisional application No. 60/837,963, filed on Aug. 16, 2006, provisional application No. 60/837,978, filed on Aug. 16, 2006.

(51) Int. Cl.
*G06F 19/00* (2006.01)

(52) U.S. Cl. .............................. 702/60; 702/57; 363/15; 363/16; 363/17; 363/24; 323/235; 323/285

(58) Field of Classification Search .................... 702/57, 702/60; 363/15, 16, 17, 24, 25, 26, 27, 20, 363/65, 28, 71, 132, 98, 72, 178; 323/274, 323/280, 285, 235

See application file for complete search history.

(56) References Cited

U.S. PATENT DOCUMENTS

| | | | | |
|---|---|---|---|---|
| 5,027,264 A | * | 6/1991 | DeDoncker et al. | 363/16 |
| 5,198,969 A | * | 3/1993 | Redl et al. | 363/17 |
| 5,724,235 A | * | 3/1998 | Shimamori et al. | 363/21.06 |
| 6,346,797 B1 | * | 2/2002 | Perreault et al. | 322/29 |
| 6,356,467 B1 | * | 3/2002 | Belehradek, Jr. | 363/24 |
| 6,809,560 B1 | * | 10/2004 | Wrathall | 327/108 |
| 6,977,518 B2 | * | 12/2005 | Higashihama et al. | 324/771 |
| 7,208,928 B2 | * | 4/2007 | Nebrigic et al. | 323/285 |
| 7,459,893 B2 | * | 12/2008 | Jacobs | 323/282 |
| 2002/0071290 A1 | * | 6/2002 | Youn et al. | 363/15 |
| 2005/0110475 A1 | * | 5/2005 | Chapuis | 323/282 |
| 2006/0091872 A1 | * | 5/2006 | Matsuura | 323/283 |
| 2006/0280314 A1 | * | 12/2006 | Okada et al. | 381/71.1 |

\* cited by examiner

*Primary Examiner*—Carol S Tsai
(74) *Attorney, Agent, or Firm*—Robert G. Crouch; Bobby B. Soltani; Marsh Fischmann & Breyfogle LLP

(57) ABSTRACT

Generally, a DC/DC converter and its associated devices and processes are presented herein. The DC/DC converter may be a switched mode converter that includes a plurality of switching devices that couple between the first and second power supply rails. A transformer is coupled to the switching devices such that the switching devices exchange electrical energy through the transformer. A rectifier is coupled to the transformer to rectify the waveform from the transformer into a substantially DC output. The DC/DC converter also includes clamp diodes to relieve voltage stress on rectifier diodes. Resistors may be coupled in series with the clamp diodes to reduce a reset time of the DC/DC converter and thereby prevent catastrophic failure of the power supply during load transients. Additionally, the DC/DC converter may be configured with a power outage detection device that monitors gate drive signals of the converter.

23 Claims, 19 Drawing Sheets

POWER OUTAGE DETECTION IN A SWITCHED MODE POWER SUPPLY

CROSS-REFERENCE TO RELATED APPLICATIONS

This patent application is related to and claims priority from U.S. Provisional Patent Application Nos. 60/837,963 (filed Aug. 16, 2006 and entitled "Fast Reset of a Phase-Shifted Full-Bridge DC/DC Converter Clamp") and 60/837,978 (filed Aug. 16, 2006 and entitled "Fast AC Outage Detection"), the entire contents of each of which are incorporated within by reference.

BACKGROUND

A phase-shifted full-bridge DC/DC converter, in its basic form may include a primary side containing a set of switches used to control the application of an input voltage to the primary coil of a transformer, and a secondary side containing a set of output diode rectifiers that serve to produce a voltage with constant polarity. The converter may be in an active state, during which a differential voltage is applied across the primary coil of the transformer, or in a passive state, during which the same voltage is applied to both terminals of the transformer's primary coil. Thus, electrical energy flows in the converter during the active state.

Switching losses occur when the semiconductor switches transition from on to off or vice versa. In order to achieve high efficiency in a phase-shifted full-bridge DC/DC converter, low switching losses are maintained over a wide range of operating conditions. This is typically achieved by adding a "resonant inductor" to the primary side of the converter and adding "dead time" delay between the two switches in each half-bridge to allow time for the output voltage of the half-bridge to commutate prior to activating the opposing switch. However, the inductive source impedance causes voltage overshoot and ringing during the decaying portion of the reverse current that occurs in the output rectifier diodes following a state transition in the converter. This voltage overshoot and ringing can generate excessive dynamic losses, unacceptable EMI, and increased voltage stress on the diodes at the secondary-side of the converter. Failure of the rectifier diodes can occur due to the increased voltage stress. A typical solution to this problem involves clamping the junction between the transformer and the resonant inductor to the supply rails with two diodes, known as clamp diodes.

SUMMARY

It is generally known that the clamp diode solution may not correctly protect the full-bridge converter during load transients to very small loads, a problem which is poorly understood and typically solved by adding large pre-loads to the converter. The invention described hereinbelow shows actual mechanisms involved in the poor performance of the clamp diode solution at small loads, and presents a relatively low-cost and efficient solution which will work over virtually all operating conditions of the converter.

During an active-to-passive state transition (initiated by turning off the right-side half-bridge), load current flows through the capacitance of the right-side half-bridge and commutates the right-side half-bridge voltage prior to turning on the opposing right-side half-bridge switch. During a passive-to-active state transition (initiated by turning off the left-side half-bridge), the direction of load current is wrong for commutating the left-side half-bridge through the half-bridge capacitance. A resonant inductor is therefore added in line with the left-side half-bridge for commutating the voltage to obtain zero-voltage-switching. After the left-side half-bridge switch is turned off, the load current in the primary of the transformer is diverted to a clamp diode while the resonant inductor and half-bridge capacitance allows the left-side half-bridge voltage to commutate to the opposing rail prior to turning on the opposing left-side half-bridge switch. After the opposing left-side half-bridge switch is turned on, the voltage across the resonant inductor is equal to the difference between the half-bridge switch drain-source voltage and the clamp diode forward voltage. This is typically a very small voltage difference on the order of 1V. The small inductor voltage drives the resonant inductor current to zero, after which the clamp diode turns off and the left-side half-bridge carries the full load current.

When a phase-shifted full-bridge DC/DC converter is operating under steady-state conditions, the duration of each active state is designed to be longer than the time needed to reset the resonant inductor current. Under these conditions, the current pulse flowing through the clamp diodes at the beginning of each active phase has sufficient time to reset to zero before the next passive phase. However, during a load transient, the duration of each active state may decrease significantly, leaving insufficient time to fully reset the resonant energy in the resonant inductor before the next passive phase. As a result, the clamp diode current increases on each subsequent cycle. As the resonant inductor current increases, the difference between the left-side half-bridge drain-source voltage and the clamp diode forward voltage decreases which further increases the required reset time for the resonant inductor current. The process of increasing inductor current and subsequent increasingly required reset time leads to heating of the clamp diode, thus lowering its forward voltage and making the problem worse. The eventual result is typically the destruction of the clamp diodes and thus the DC/DC converter. Operating the converter in no-load burst mode can produce a similar result.

Some designs include a substantial preload at the output to prevent the converter from going into burst mode. However, addition of a preload often adds cost, consumes additional space, reduces efficiency, and adds to the thermal burden of the DC/DC converter. Regardless, the preload still does not prevent the DC/DC converter from operating in burst mode. Nor does the preload prevent the electric current through the clamp diodes from becoming relatively high during a load transient.

Other designs may employ relatively large clamp diodes to handle overcurrents that occur due to the high currents during transients and/or relatively fast clamp diodes to increase the voltage drop in the clamp diodes and thereby reduce the reset time. Larger and/or faster clamp diodes, however, generally increase the cost of the DC/DC converter. Alternative designs have DC/DC converters operating at lower frequencies to provide enough time for the electric current to reset, which also generally increases the size and cost of the DC/DC converter.

In one embodiment, a DC/DC converter (e.g., a phase-shifted full-bridge converter) includes first and second power supply rails, a plurality of switching devices that couple between the first and second power supply rails, and a transformer coupled to the switching devices. The switching devices (e.g., MOSFETs) exchange energy through the transformer. The converter also includes a rectifier coupled to the transformer that rectifies electrical energy through the transformer. The converter also includes a resonant inductor to prevent switching losses in the converter. To reduce ringing associate with the resonant inductor, the converter may includes one or more clamp diodes that are coupled between the first and second power supply rails, to the resonant inductor, and to the transformer. At least one load element is coupled between the one or more clamp diodes and the power supply rails for reducing a reset time of the DC/DC converter.

The DC/DC converter may include a controller to provide four-state pulse width modulation. The switching devices may be metal oxide semiconductor field effect transistors. The at least one load may include a resistor (e.g., between about 100 milliOhms and 100 Ohms. A first load element and a first clamp diode may be coupled in series between the first power supply rail and the transformer. A second load element and a second clamp diode may be coupled in series between the transformer and the second power supply rail. The first and second load elements may have the same or different values and may include a diode or a diode-resistor combination.

In another embodiment, a method of operating a DC/DC converter includes receiving electrical energy, first conducting the electrical energy through a transformer in a first polarity for a first duration, and second conducting the electrical energy through the transformer in a second polarity for a second duration. With at least two clamp diodes, the method further includes clamping voltage of the electrical energy through the transformer during said first and second conducting. With at least a first load element, the method also includes resetting current in a first of the at least two clamp diodes after said first conducting and before said second conducting. The method also includes rectifying the electrical energy to a substantially DC output responsive to said first and second conducting.

A second load element may be used for resetting current in a second of the at least two clamp diodes after said second conducting. The load elements may be a resistor having a value between about 100 milli-Ohms and 100 Ohms. The current may be reset to substantially 0 Amps in response to a load transient or while the converter is in burst mode. This resetting of the current may provide voltage stress relief to the at least two clamp diodes.

In another embodiment, an outage detection system is provided. For example, the power outage detection system may be configured for quickly determining an AC outage of a switched mode power supply, such as the DC/DC converter described herein. However, the power outage detection system is not intended to be limited to simply the DC/DC converter. Rather, the detection system may be configured with other types of switched mode power supplies or other circuits. The detection system includes an input/output module configured for receiving one or more pulsed control signals from a device and generating a control signal responsive thereto. The detection system also includes a filter communicatively coupled to the input/output module to filter the generated control signal of the input/output module and a processor communicatively coupled to the filter to receive the filtered control signal and determine an operational parameter (e.g., an AC outage) of the device therefrom.

In order to implement the design in practice, it may be necessary to distinguish between AC outages and load transients that cause the input DC bus voltage to decrease. For example, when a load transient occurs, the comparator level for the outage detection is temporarily decreased so as not to cause false trips in the detector. To adjust the comparator level, it may be necessary to obtain a signal proportional to load current. Such a signal is often present in power supplies due to the need for current limiting. The signal then needs to go through a high-pass filter and added to the fast-AC detector comparator level. The speed of the high-pass filter will depend on the compensation loop of the converter, and should imitate the compensation loop speed. Typically, a first-order high-pass filter (formed by a single resistor and capacitor) should be adequate. In the case of the converter used in experiments, the microcontroller already had a signal proportional to load current, so it was capable of determining the effect of load transients with no additional circuitry. The microcontroller was capable of implementing the comparator and the high-pass filter digitally. Additionally, the microcontroller may adjust and intermediate bus voltage reference.

In one embodiment, the detection system includes a signal processor that produces the inverse of the combined gate-drive logic in a converter; a filter for that combined inverse gate-drive signal; a reference adjusted for the expected intermediate bus voltage of the converter such that the reference is appropriately shifted to ignore load transients; and a comparator to compare the combined inverts the gate-drive signal to the adjusted intermediate bus voltage reference.

As mentioned, the device may be a DC/DC converter or other type of switch mode power supply. In this regard, the one or more pulsed control signals are drive signals to switches in the DC/DC converter.

The filter may be configured for smoothing transients in the one or more pulsed control signals. For example, the filter may be a high pass filter and the pulsed control signals may be pulsed width modulated gate drive signals of a switched mode power supply. The processor may determine the operational parameter of the device by comparing the filtered control signal to a threshold value (e.g., a reference voltage, such as an intermediate bus voltage or a representative thereof).

The input/output module may include one or more diodes configured for respectively receiving the one or more pulsed control signals. The input/output module may include a least one control diode having an anode coupled to the one or more diodes and to a control signal source for generating the control signal responsive to the one or more pulsed control signals. Alternatively, the input/output module 611 may include a signal processor configured for generating an inverse of gate drive signals from a DC/DC converter.

The processor may be further configured for determining an intermediate bus voltage of the DC/DC converter. The processor may include a comparator configured for comparing the filtered control signal to the intermediate bus voltage. Additionally, the processor may adjust the intermediate bus voltage based on load transients.

In one embodiment, a method of detecting a power outage in a switched mode power supply, such as a DC/DC converter, includes monitoring a first one or more control signals that are used to control switching of the switched mode power supply and generating a second one or more control signals in response to monitoring the first one or more control signals. The method also includes filtering the second one or more control signals of transients associated with the first one or more control signals and processing the filtered second one or more control signals to determine operability of the switched mode power supply.

Monitoring the first one or more control signals may include receiving the first one or more control signals with a corresponding number of diodes. For example, receiving the first one or more control signals with the corresponding number of diodes may include holding the diodes in a reverse bias state during on times of the first one or more control signals.

Filtering the second one or more control signals may include providing a frequency response representative of a PWM control signal of a switched mode power supply. Processing the second one or more control signals may include comparing the second one or more control signals to a reference signal, such as an intermediate bus voltage or a representative thereof.

Generating the second one or more control signals may include conducting electric current through a corresponding number of diodes responsive to on times of the first one or more control signals.

In one embodiment, an AC outage detection system for use in a switched mode power supply includes a first reference voltage source and a first set of one or more diodes configured to receive a first reference voltage from the first reference voltage source through one or more resistors. The detection system also includes a second set of one or more diodes configured to receive the first reference voltage through the one or more resistors, wherein the second set of the one or more diodes are reversed biased according to off times of a corresponding number of pulse width modulation control signals and wherein the first set up the one or more diodes generates a control signal representative of an inverse of the corresponding number of pulse width modulation control signals. The detection system also includes a filter configured for receiving the inverse of the corresponding number of pulse width modulation control signals and a processor configured for receiving a filtered inverse of the corresponding number of pulse width modulation control signals for comparison to a second reference voltage. Based on the comparison, the processor determines when an AC power supply no longer supplies power to the switched mode power supply. In this regard, the pulse width modulation control signals may be gate drive signals of the switched mode power supply that cease operations upon an outage of the AC power supply. The second reference voltage is an adjusted intermediate bus voltage. The processor may be further configured for determining an intermediate bus voltage of a DC/DC converter.

DETAILED DESCRIPTION OF THE DRAWINGS

Reference will now be made to the accompanying drawings, which assist in illustrating the various pertinent features of the present invention. Although the present inventions will now be described primarily in conjunction with a DC/DC converter and power outage detection, it should be expressly understood that the present inventions may be applicable to other applications. In this regard, the following description of an exemplary DC/DC converter and an exemplary power outage detection system are presented for purposes of illustration and description. Furthermore, the description is not intended to limit the inventions to the form disclosed herein. Consequently, variations and modifications commensurate with the following teachings, and skill and knowledge of the relevant art, are within the scope of the present invention. The embodiments described herein are further intended to explain modes known of practicing the inventions and to enable others skilled in the art to utilize the invention in such, or other embodiments and with various modifications required by the particular application(s) or use(s) of the present inventions.

Figure 1:
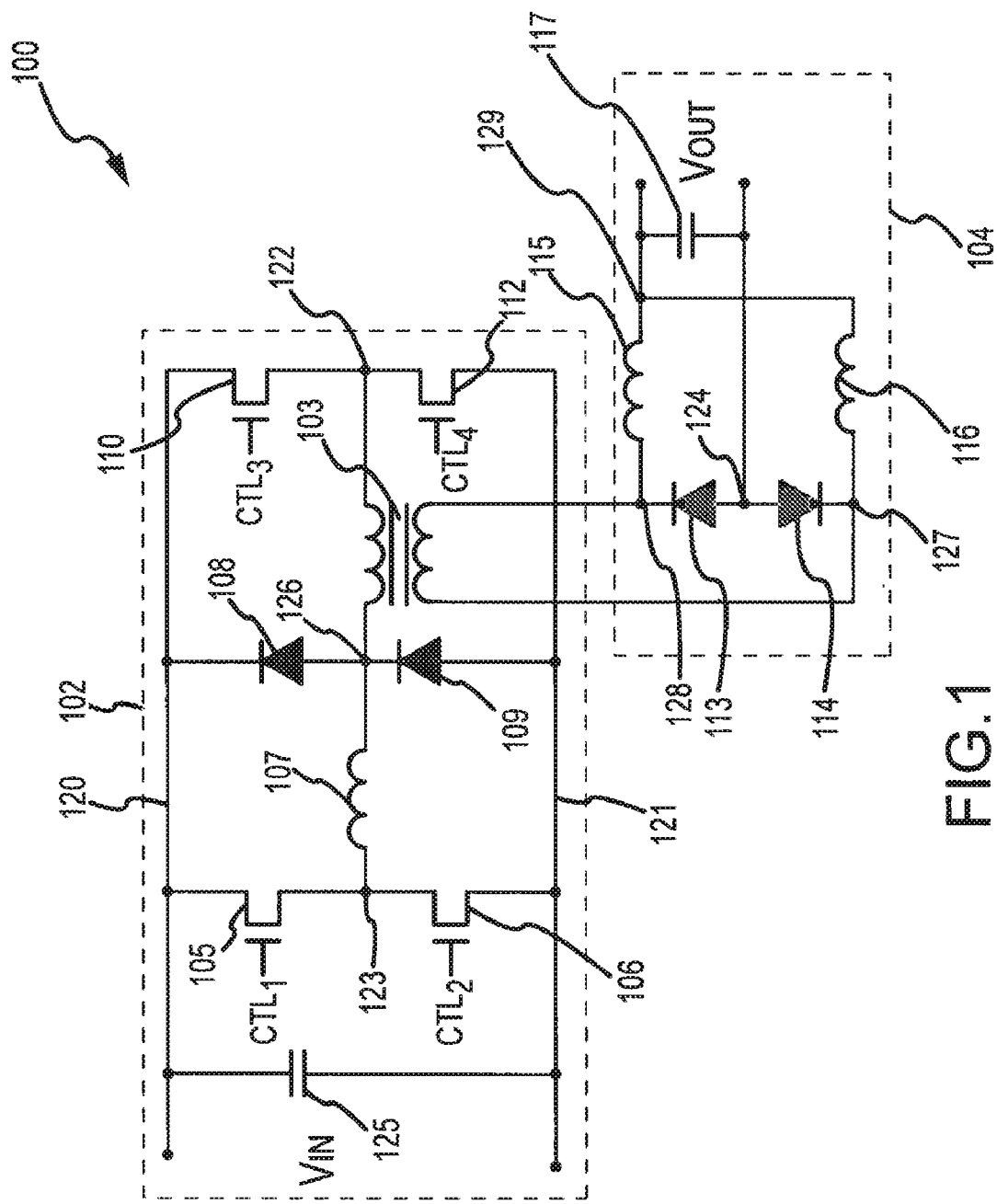
FIG. 1 is a circuit diagram of a prior art DC/DC converter.

Turning now to the drawings, FIG. 1 shows a block diagram of a prior art phase-shifted full-bridge DC/DC converter 100 used to convert an input voltage Vin to an output voltage Vout. The DC/DC converter 100 includes an H-bridge 102 and a rectifier circuit 104. The H-bridge 102 comprises two half-bridges, first half-bridge also called the left-side half-bridge comprising switches 105 and 106 (e.g., MOSFETs or other devices) and second half-bridge also called the right-side half-bridge comprising switches 110 and 112 (e.g., MOSFETs or other devices). In a phase-shifted full-bridge, the H-bridge is generally configured such that the right-side and left-side half-bridges each operate with approximately 50% duty cycle and a phase-shift between the pulses to the two half-bridges determines the overall duty-cycle of the converter. The rectifier circuit 104 receives the alternating current and rectifies that current to provide a substantially DC voltage Vout.

Structurally, the H-bridge 102 is configured with the MOSFETs 105 and 110 being coupled to the supply rail 120 with the MOSFETs 106 and 112 being coupled to the supply rail 121. The supply rails 120 and 121 receive DC electrical energy with the voltage Vin from the DC power supply 125 (e.g., a battery). A resonant inductor 107 is connected between the MOSFETs 105 at 106 at node 123. The resonant inductor 107 is also coupled to the node 126 where the clamp diodes 108 and 109 are also coupled. The clamp diodes 108 and 109 provide relief from voltage stress on the rectifier diodes 113 and 114 of the rectifier circuit 104.

The clamp diode 108 has an anode connected to the node 126 and a cathode connected to the supply rail 120. The clamp diode 109 has an anode connected to the supply rail 121 and a cathode connected to the node 126. In a typical implementation of the DC/DC converter 100, the resonant inductor 107 and the two clamp diodes 108 and 109 are used to limit ringing and reduce the switching losses and voltage stresses of the rectifier diodes 113 and 114 that normally occur during transitions from an active to a passive state or from a passive to an active state.

For example, during a first active state, only the MOSFETs 105 and 112 are conducting and the voltage applied to the primary coil of the transformer 103 has the same polarity as the input voltage Vin. In a second active state, only the MOSFETs 110 and 106 are conducting and the voltage applied to the primary coil of the transformer 103 has the opposite polarity of the input voltage Vin. During a passive state, the same voltage is transmitted to both input terminals of the transformer 103 (e.g., by having the MOSFETs 105 and 110 turned on and the MOSFETs 106 and 112 turned off, or vice versa), resulting in a zero voltage output. In this regard, the four MOSFETs 105, 106, 110, and 112 are generally controlled by a phase-shifted, four-state, pulse width modulation (PWM) having two active states and two passive states.

In the rectifier 104, rectifier diodes 113 and 114 are coupled to the secondary side of the transformer 103. The rectifier diode 113 has an anode connected to the node 124 and a cathode connected to the node 128. The rectifier diode 114 has an anode connected to the node 124 and a cathode connected to the node 127. The rectifier 104 also includes the rectifier inductors 115 and 116. The rectifier inductor 115 is connected between the nodes 128 and 129. The rectifier inductor 116 is coupled between the nodes 127 and 129. These rectifier inductors 115 and 116 charge the capacitor 117 which, in turn, provides the DC voltage Vout. The difference between Vin and Vout is therefore based on the "turns ratio" of the transformer 103. That is, the transformer 103 either steps the input voltage Vin up or down depending on the turns ratio of the transformer 103 which, when rectified by the rectifier circuit 104, provide a corresponding DC Vout.

While the clamp diodes 108 and 109 relieve voltage stress on the rectifier diodes 113 and 114, the clamp diodes increase the time for the electric current to reset for the resonant inductor 107. This slower reset of the electric current through the resonant inductor 107 can cause the DC/DC converter 100 to be destroyed during sudden large decreases in load. For example, the reset time of the current is generally inversely proportional to the voltage that appears across the resonant inductor 107. The reset voltage across the resonant inductor 107 is only equal to the difference between forward voltages of the clamp diodes 108 or 109 and the drain-source voltages of the corresponding MOSFETs 105 or 106, generally on the order of 1 V. The relatively low forward voltage of the clamp diodes 108 and 109 causes the reset time to be relatively high. In the case of load transients in which the converter goes into a burst mode, the large changes in phase-shift angle accompanied by the inability of the resonant inductor current to reset can often cause the resonant inductor current to increase each switching cycle. The substantial increase in the resonant inductor current may cause catastrophic failure of the devices which share the inductor's current path, namely the clamp diodes 108 and 109 and/or the semiconductor switches 105 and 106. Additionally, the forward voltages of the clamp diodes 108 and 109 generally decrease as the temperature increases leading to an increased reset time for the resonant inductor current. Thus, when the DC/DC converter 100 operates at warmer temperatures, the DC/DC converter 100 is more likely to be destroyed during a load transient.

As mentioned, the DC/DC converter 100 may be configured with a substantial preload at the output to, for example, prevent the converter going into burst mode. Alternatively or additionally, the DC/DC converter may be configured in other ways. Regardless, these configurations generally add cost, consume additional space, reduce efficiency, and/or add to the thermal burden of the DC/DC converter.

Figure 2A:
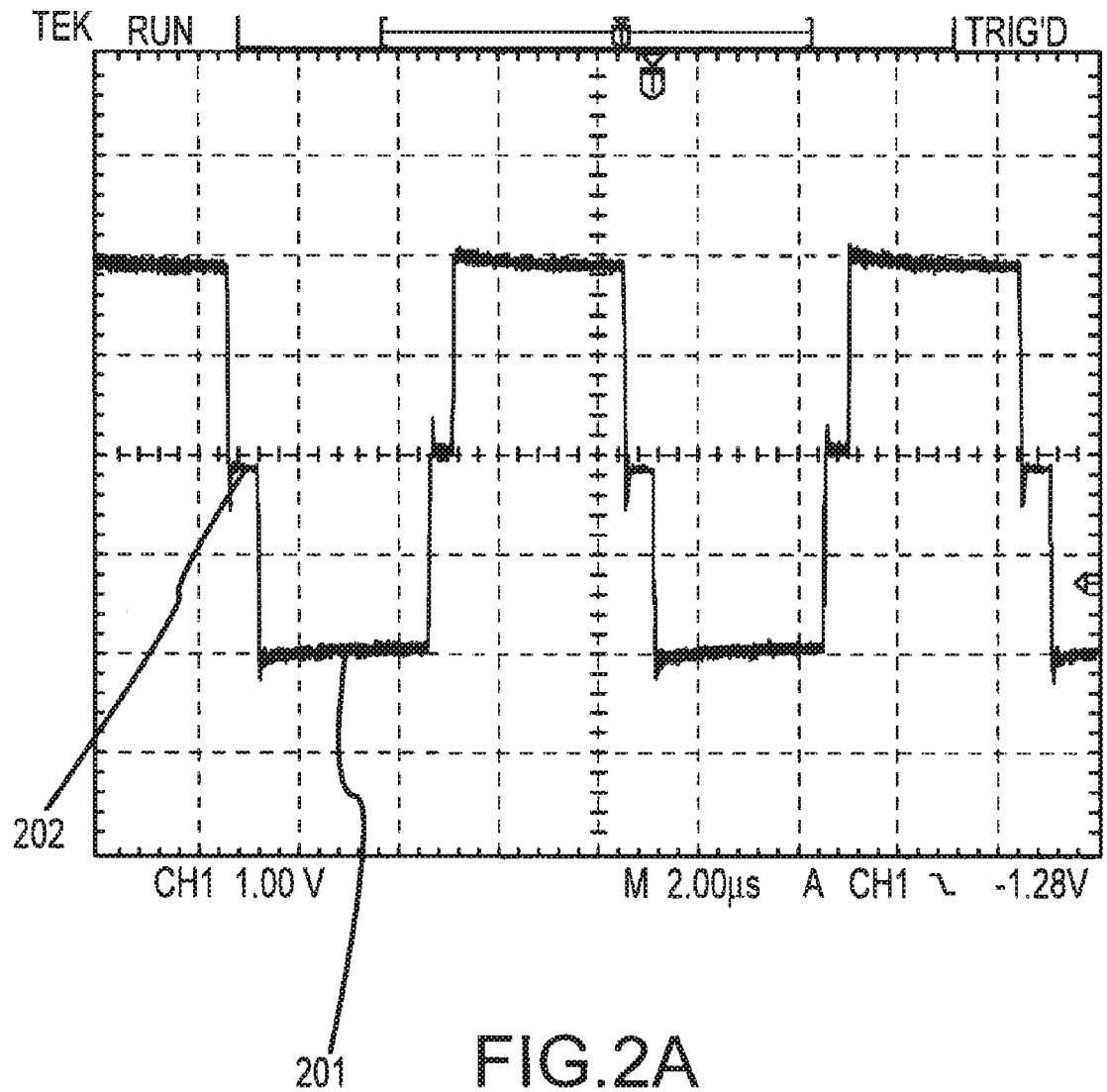
FIGS. 2A-2C are graphs illustrating waveforms during a full load operation of the converter of FIG. 1.
Figure 2B:
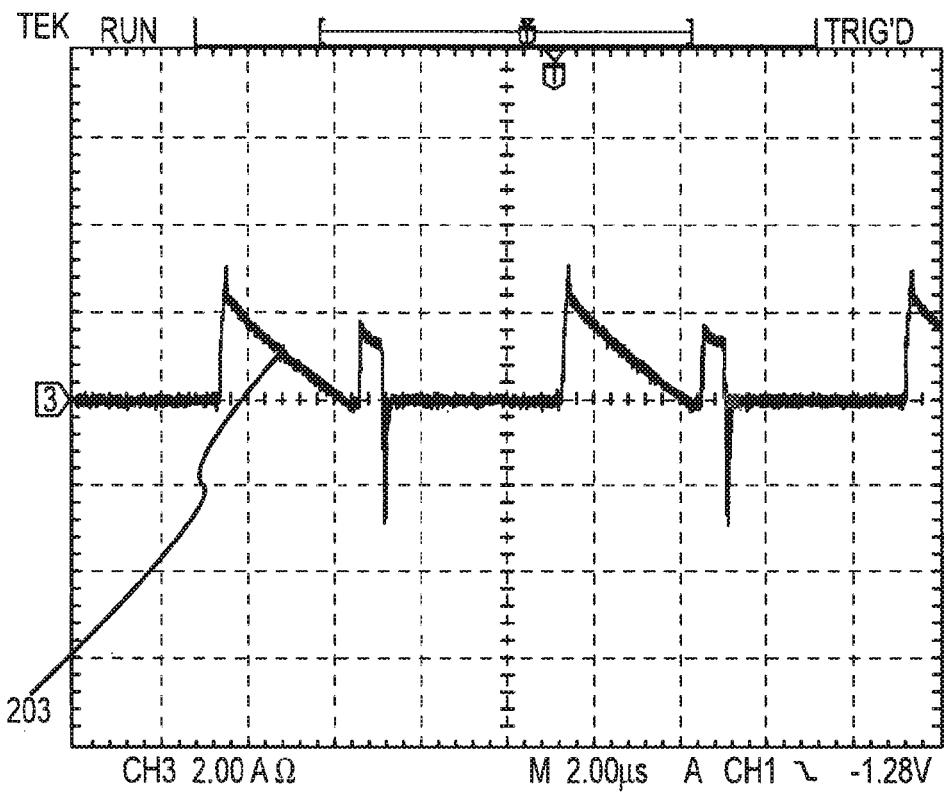
Figure 2C:
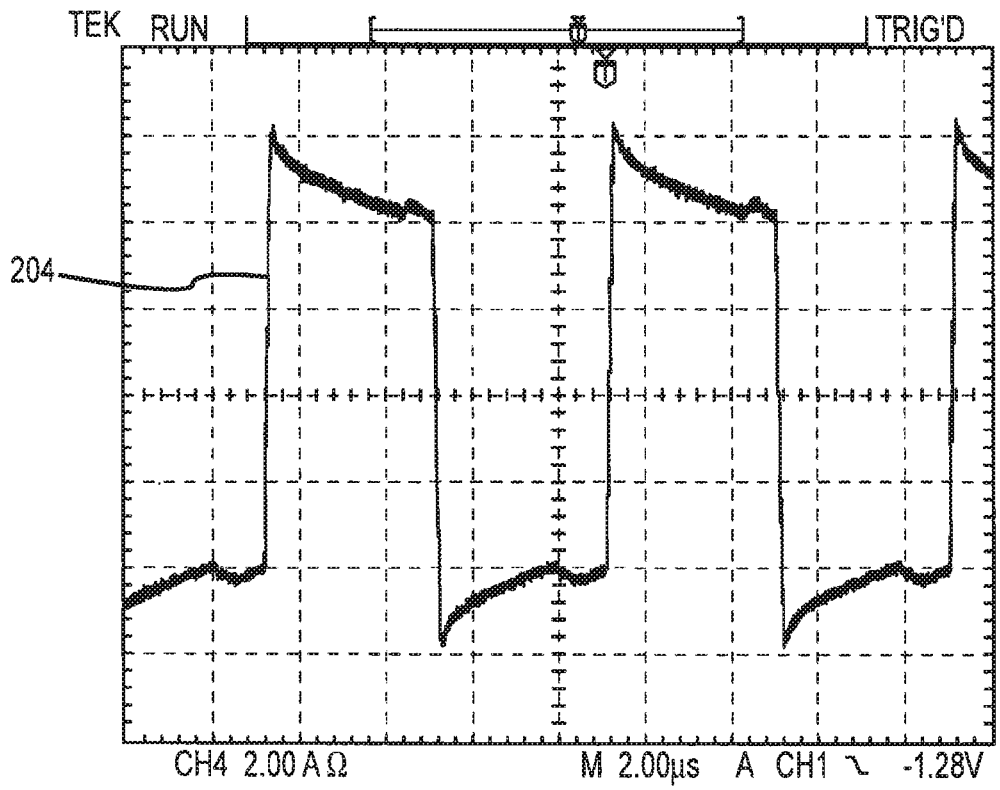

FIGS. 2A-2C are graphs illustrating waveforms during a full load operation of the converter of FIG. 1. For example, FIG. 2A shows the differential voltage 201 across the MOSFETs 106 and 112 as they alternately turn on and off. Note that this is approximately the same as the voltage appearing across the primary of transformer 103. A relatively small time delay exists between turning on one set of MOSFETs (e.g., the MOSFETs 105 and 112) and turning off the other set of MOSFETs (e.g., the MOSFETs 110 and 106). The time delay prevents short-circuiting of the input voltage (e.g., via conduction through the MOSFETs 105 and 106) and also allows zero-voltage switching of the MOSFETs at adequate load levels. Time period 202 represents the time that switches 106 and 112 are both ON, and shows that the converter is operating below its maximum duty cycle. At the maximum duty cycle of the converter, time period 202 would vanish. FIG. 2B shows the current 203 through the clamp diode 108. Under full load conditions, the current through the clamp diode 108 resets to zero during each switching half-cycle. FIG. 2C shows the current 204 through the resonant inductor 107 under full load conditions.

Figure 3A:
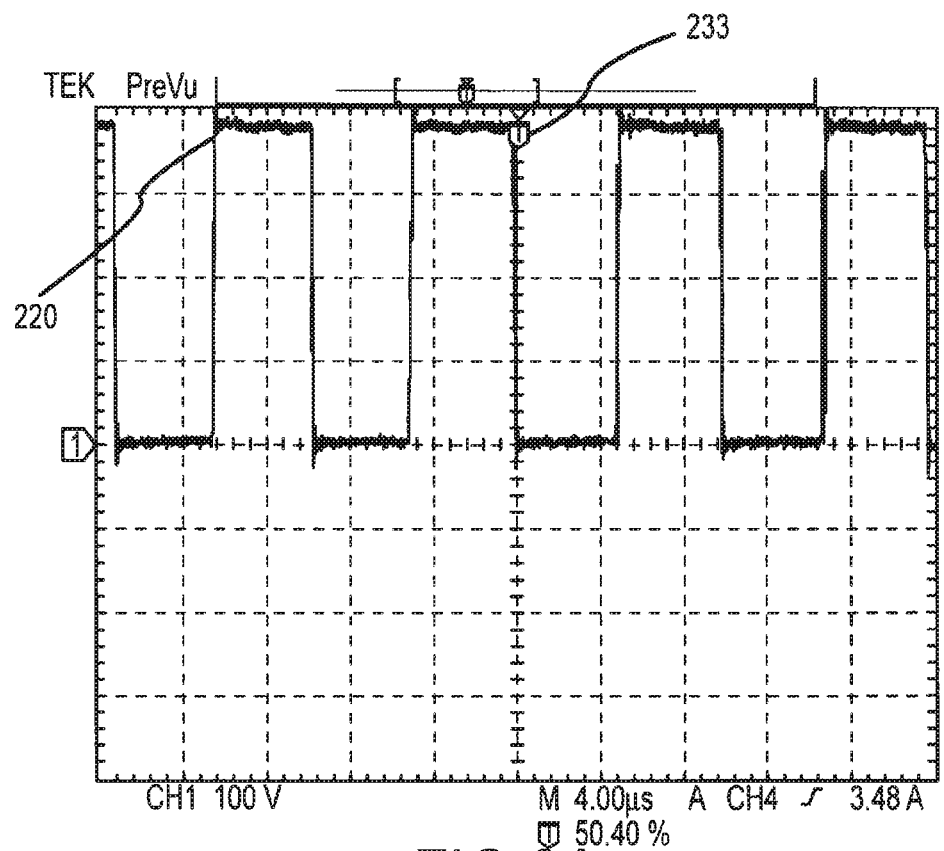
FIGS. 3A-3D are graphs illustrating waveforms during a full-load-to-no-load transient of the converter of FIG. 1.
Figure 3B:
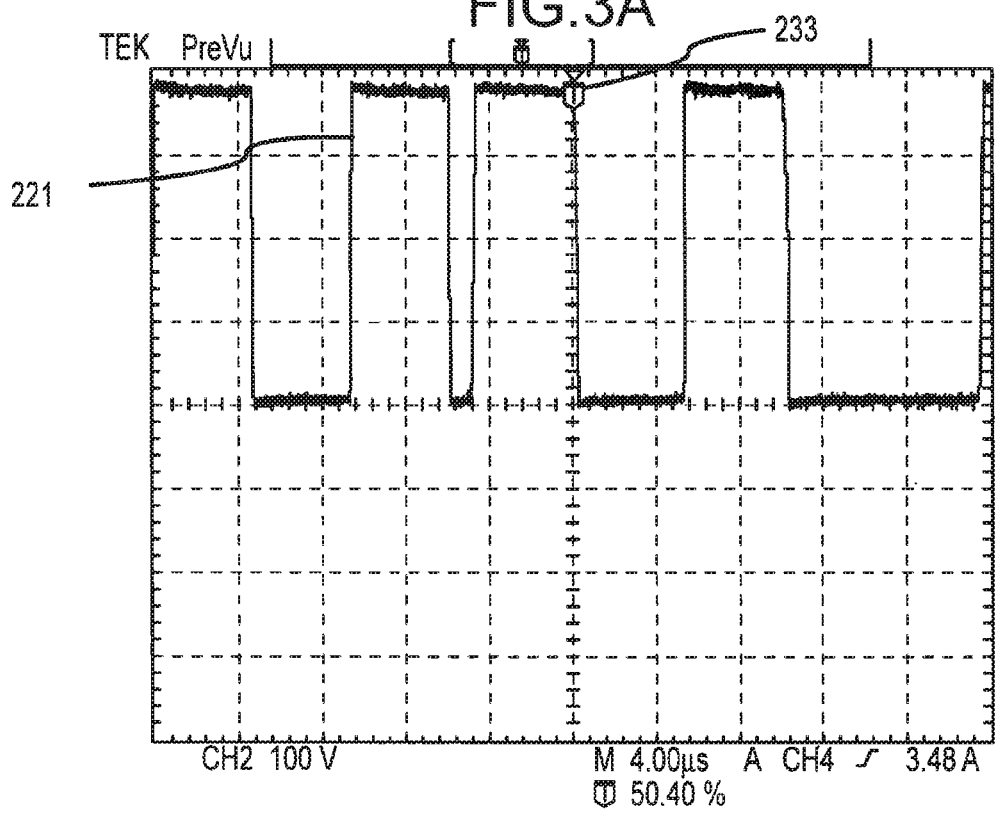
Figure 3C:
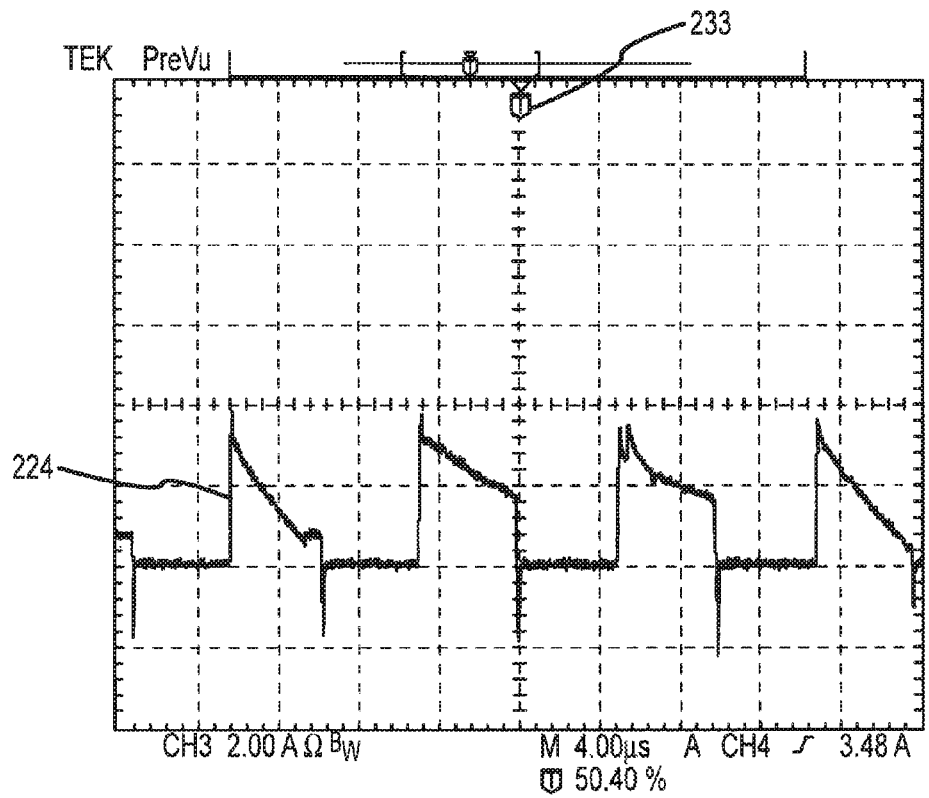
Figure 3D:
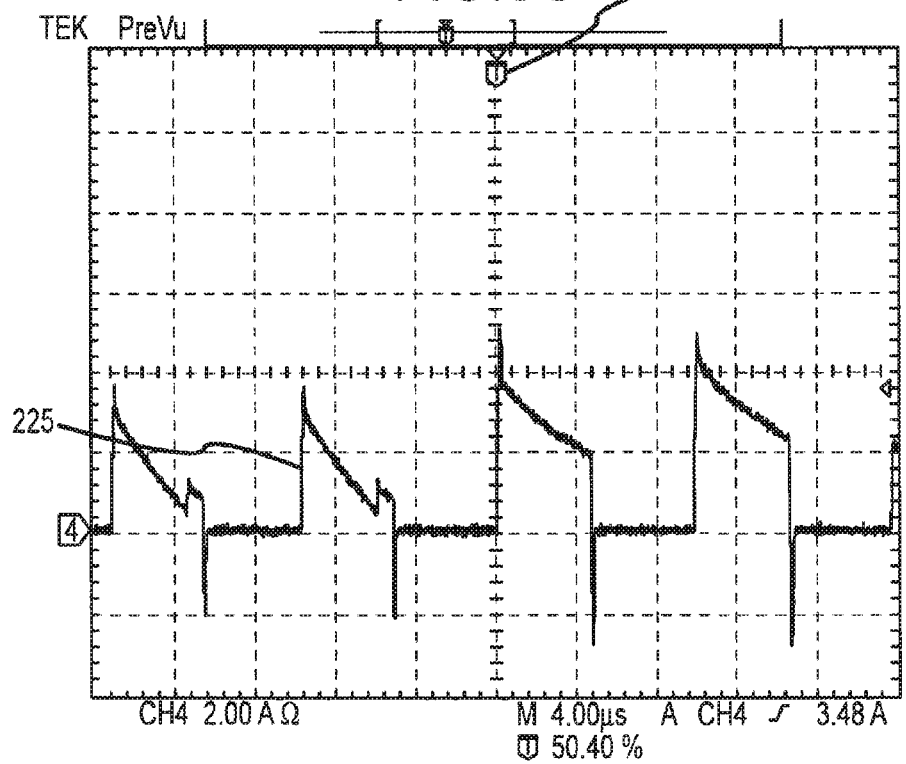

FIGS. 3A-3D are graphs illustrating waveforms during a full load to no load transient of the converter of FIG. 1. For example, FIG. 3A shows the voltage 220 across the MOSFET 106. FIG. 3B shows the voltage 221 across the MOSFET 112. FIGS. 3C and 3D show the currents 224 and 225 through the clamp diodes 108 and 109, respectively. Prior to the full load to no load transient 223, the MOSFETs 106 and 112 are approximately 150° out of phase. Here, the currents 224 and 225 through the clamp diodes 108 and 109 have just enough time to reset to 0 amps during each switching half-cycle. Following the transient 223, however, the MOSFET voltages are roughly in phase with each other and the currents 224 and 225 through the clamp diodes 108 and 109 do not have time to reset to 0 amps. Consequently, the currents 224 and 225 increase during each subsequent cycle. Eventually, this slow reset can destroy the clamp diodes 108 and 109 and, thus, the DC/DC converter 100.

Figure 4:
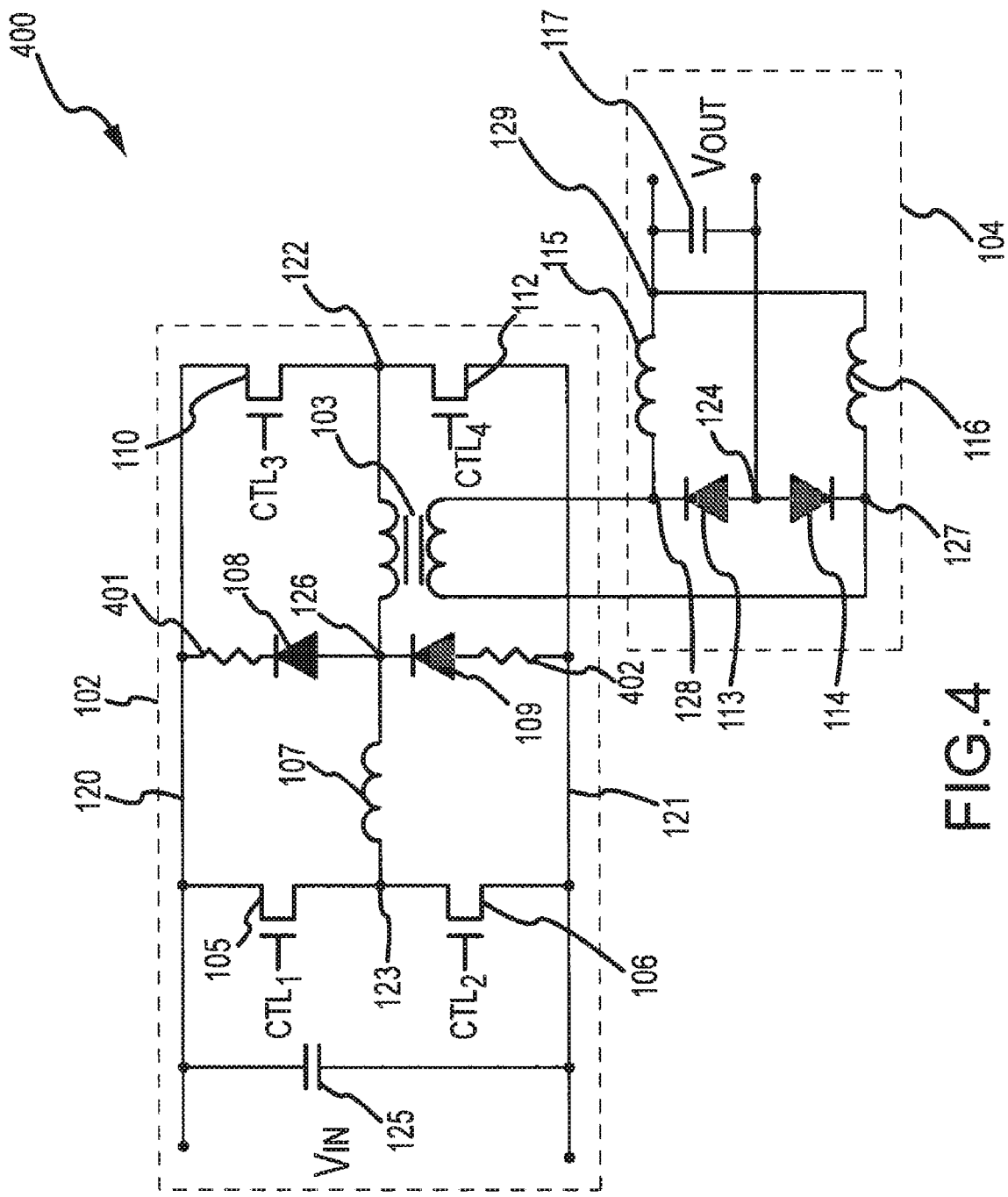
FIG. 4 is a circuit diagram of an exemplary DC/DC converter configured with load elements in series with clamp diodes.

FIG. 4 is a circuit diagram of an exemplary DC/DC converter 400 configured with load elements 401 and 402 in series with the clamp diodes 108 and 109, respectively. In this embodiment, the load elements 401 and 402 are configured as resistors; however, the load elements 401 and 402 may be configured in other ways. For example, the load elements 401 and/or 402 may be circuits that include diodes or diode-resistor combinations. The load elements 401 and 402 are configured to cause the reset voltage across the resonant inductor 107 to increase. In this regard, the load elements 401 and 402 cause the reset voltage to be proportional to the electric current and, in turn, cause a faster reset time. Additionally, the momentarily higher current in the clamp diodes 108 and 109 causes the voltage drop across the load elements 401 and 402 to increase, thereby increasing the speed of the reset. Generally, the reset electric current decreases with time. The dissipation in the load elements 401 and 402 is, therefore, relatively small during changes in the DC/DC converter 400 duty cycles from load transients and from low power burst-modes.

Figure 5A:
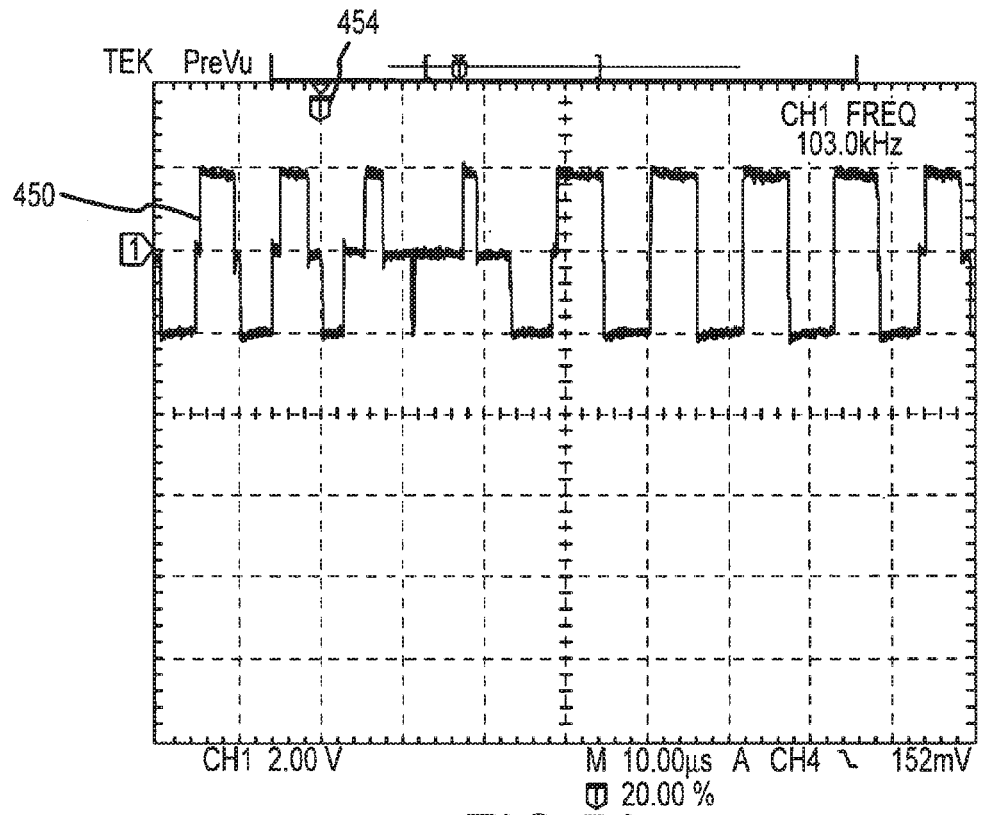
FIGS. 5A-5D are graphs illustrating exemplary waveforms during a full-load-to-no-load transient with the DC/DC converter of FIG. 4.
Figure 5B:
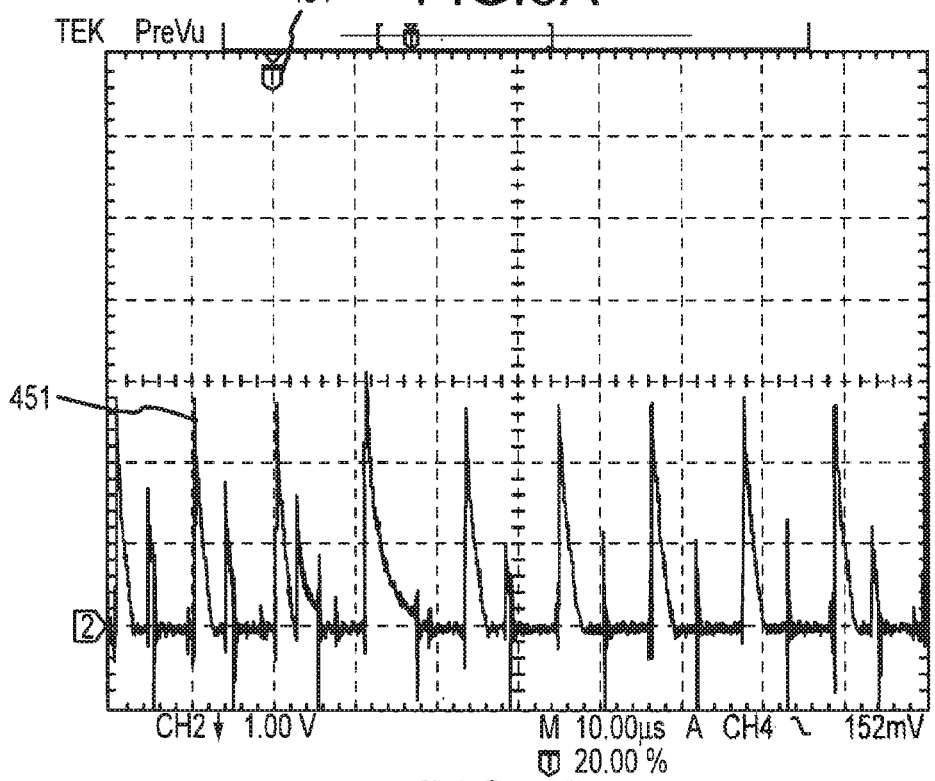
Figure 5C:
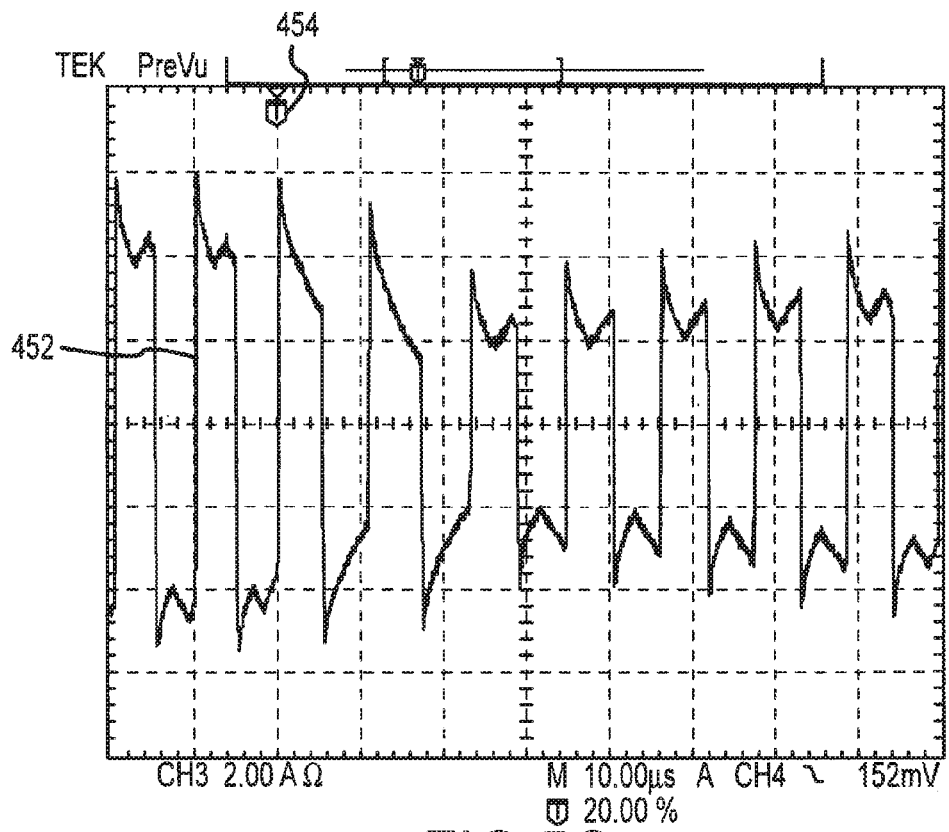
Figure 5D:
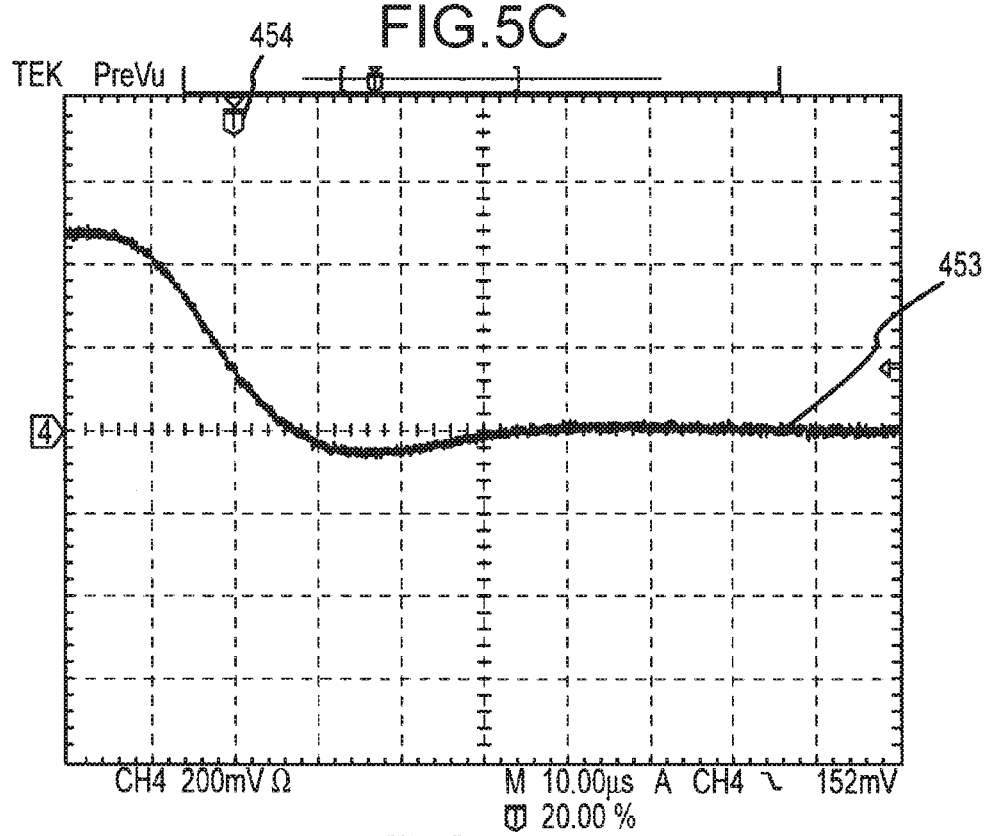
Figure 6A:
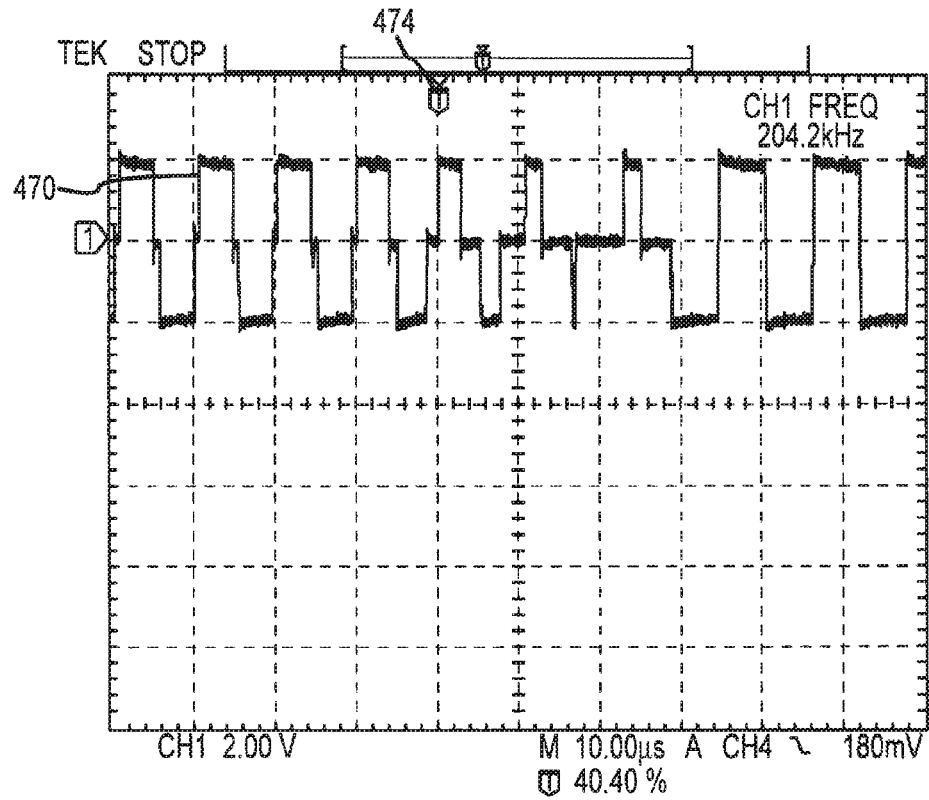
FIGS. 6A-6D are graphs illustrating exemplary waveforms also during a full-load-to-no-load transient with the DC/DC converter of FIG. 4.
Figure 6B:
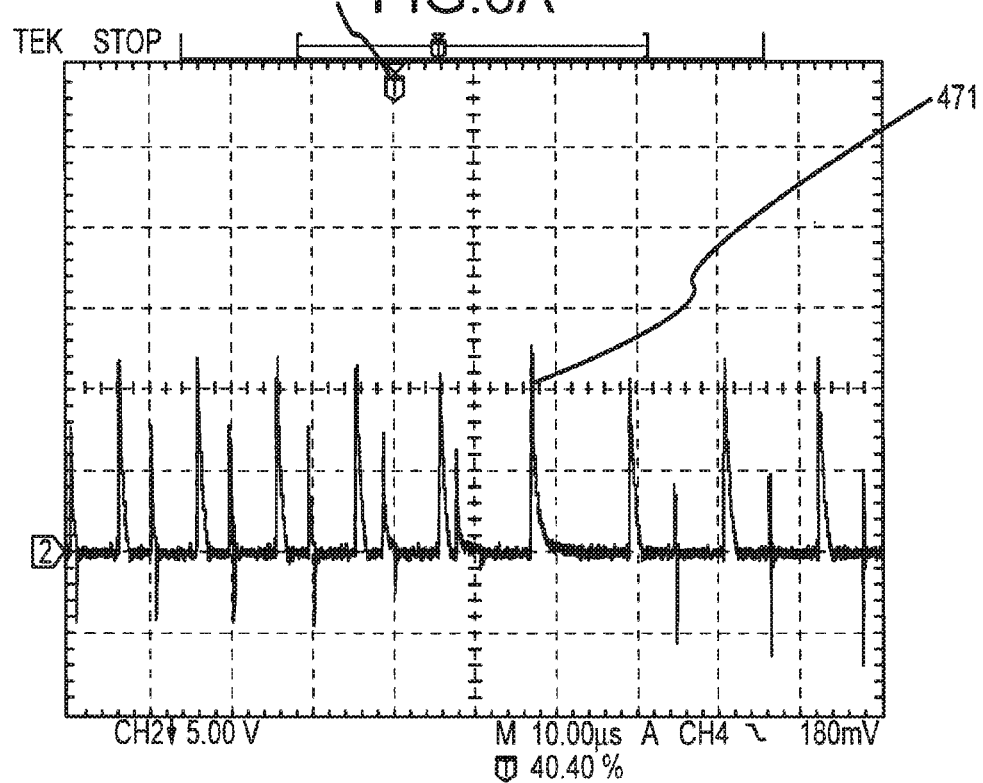
Figure 6C:
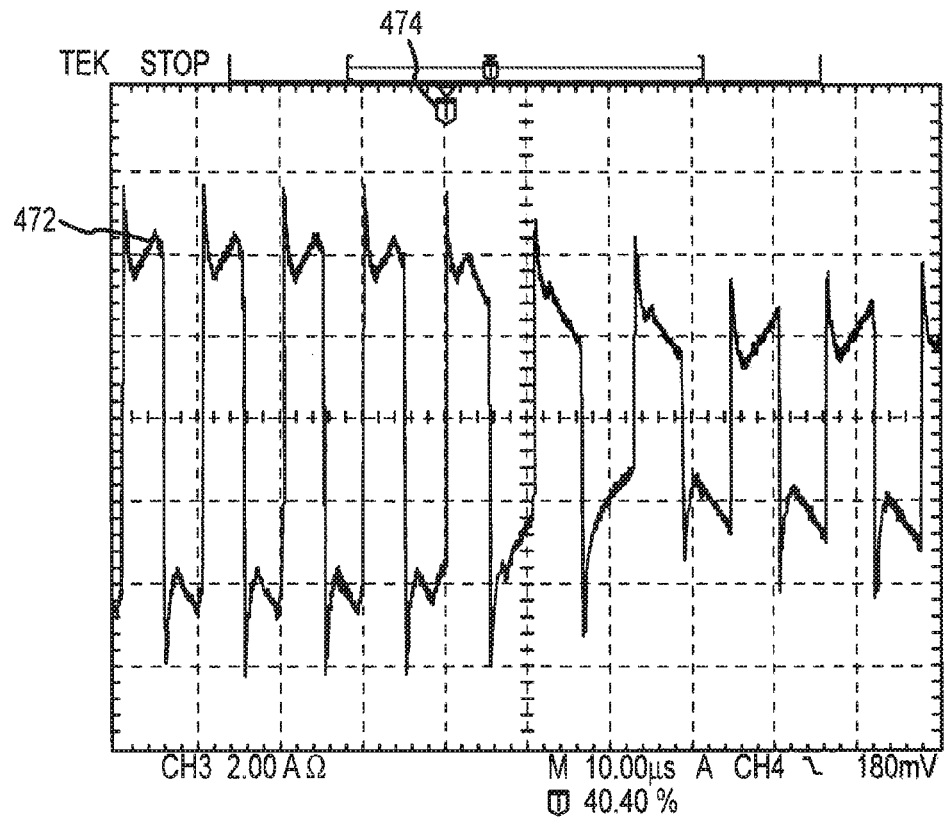
Figure 6D:
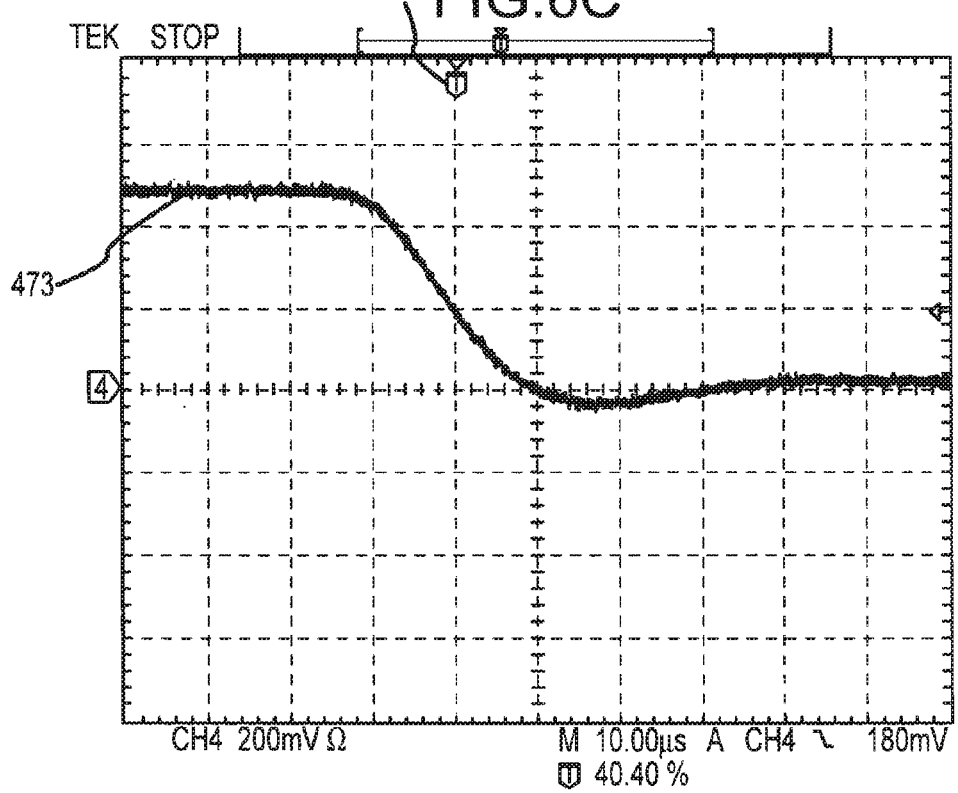

FIGS. 5A-5D are graphs illustrating waveforms during a full-load-to-no-load transient with the DC/DC converter 400 in which the load elements 401 and 402 are exemplarily configured with approximately 1 Ohm resistors in a converter designed to process 1200 W from an approximately 400 VDC bus and operate at approximately 100 kHz. Additionally, the DC/DC converter 400 may be configured with a small preload (not shown). FIG. 5A shows the differential voltage 450 across the MOSFETs 106 and 112 as the MOSFETs alternately turn on and off. FIG. 5B shows the voltage waveform 451 of the clamp diode 109. FIG. 5C shows the electric current 452 through the resonant inductor 107. FIG. 5D shows the load current 453. Immediately following the load transient 454, the load current 453 decreases to roughly 0 A and the phase between the MOSFETs 106 and 112 temporarily decreases from approximately 150° out of phase to 0° to accommodate the load-transient such that the MOSFETs 106 and 112 are in phase. The electric current through the clamp diode 109 decreases but does not completely reset to 0 A during the switching half-cycle. Thus, subsequent cycles show that the electric current through the clamp diode 109 can still cause a voltage increase following the load transient 454. Accordingly, the 1 Ohm resistors may be suitable for use in certain situations. A similar increase in the electric current generally occurs with the 1 Ohm resistor in series with the clamp diode 108.

The value of the load element in series with the clamp diode (e.g., clamp diode 108) generally must be determined for any given design by evaluating trade-offs in cost, efficiency, increased voltage stress on the secondary-side rectifier, and desired maximum switching frequency. For example, a load element which adds a larger voltage in series with the clamp diode, while providing a faster reset, will generally cause a large additional voltage spike on the secondary-side rectifier diodes 113 and 114. Efficiency may or may not be affected by increasing the voltage across the additional circuit element since the higher voltage will cause a faster decay of the inductor current to zero, thus reducing the time of current flow through the additional circuit element as well as a decrease in time that the reset current flows through the clamp diodes 108 and 109.

FIGS. 6A-6D are graphs illustrating exemplary waveforms during a full-load-to-no-load transient with the DC/DC converter 400 in which the load elements 401 and 402 are exemplarily configured with approximately 4.7 Ohm resistors. The waveforms of FIGS. 6A-6D correspond to the waveforms of FIGS. 5A-5D in that the waveforms were obtained from the same locations on the DC/DC converter 400. As can be seen in the voltage waveforms 470 and 473, the load current 473 decreases to 0 A after the load transient 474 and the phase between the MOSFETs 106 and 112 again temporarily decreases from approximately 150° out of phase to 0° after the load transient 454. However, the approximately 4.7 Ohm resistor in conjunction with the clamp diode 109 now causes the electric current through the clamp diode 109 to quickly reset to 0 A even after the load transient 474 occurs. Thus, the voltage of the clamp diode 109 (e.g., as illustrated by the voltage waveform 471) quickly decreases to 0 V. A similar reset of the electric current generally occurs with the approximately 4.7 Ohm resistor in series with the clamp diode 108. Thus, the addition of the two 4.7 Ohm resistors provides an inexpensive means for ensuring a reset of the clamp diodes 108 and 109.

Figure 7A:
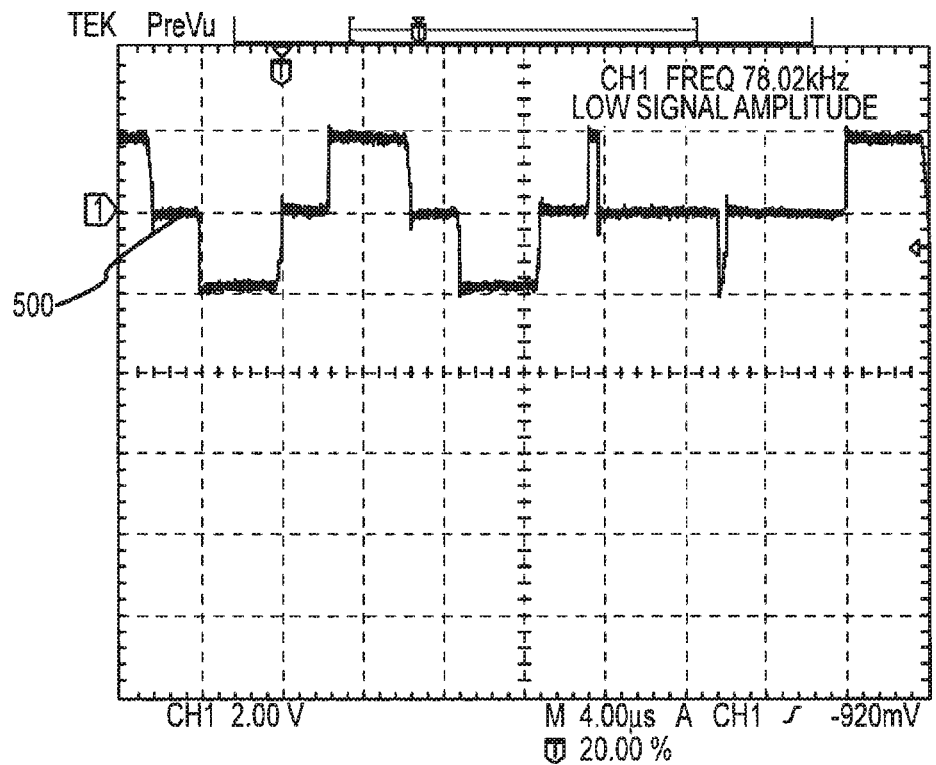
FIGS. 7A-7C are graphs illustrating exemplary waveforms during a burst mode of the DC/DC converter of FIG. 4.
Figure 7B:
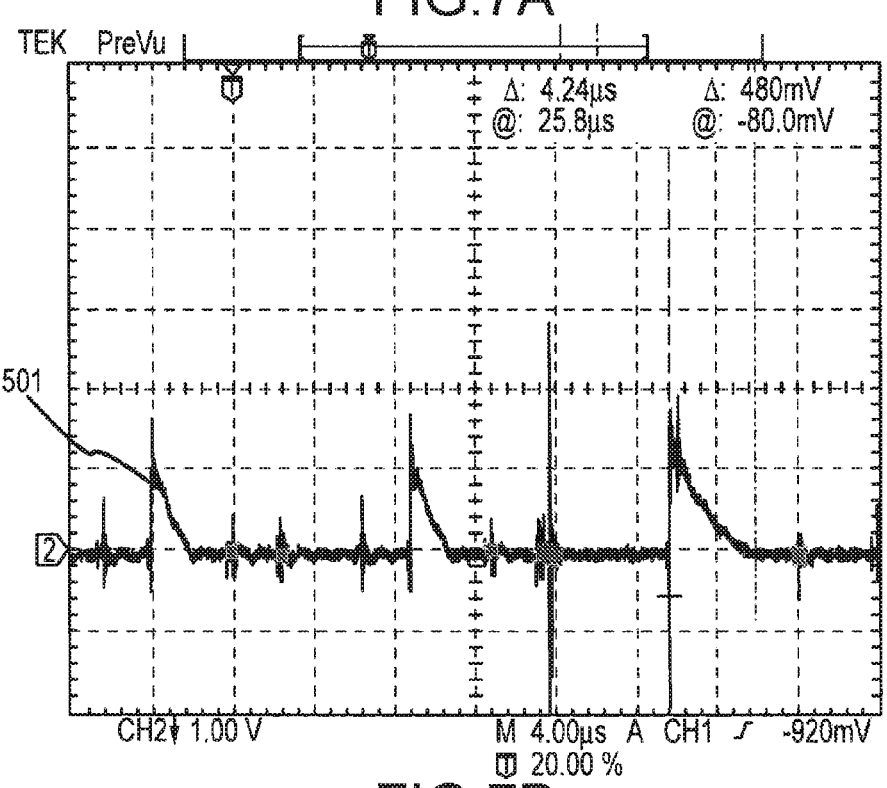
Figure 7C:
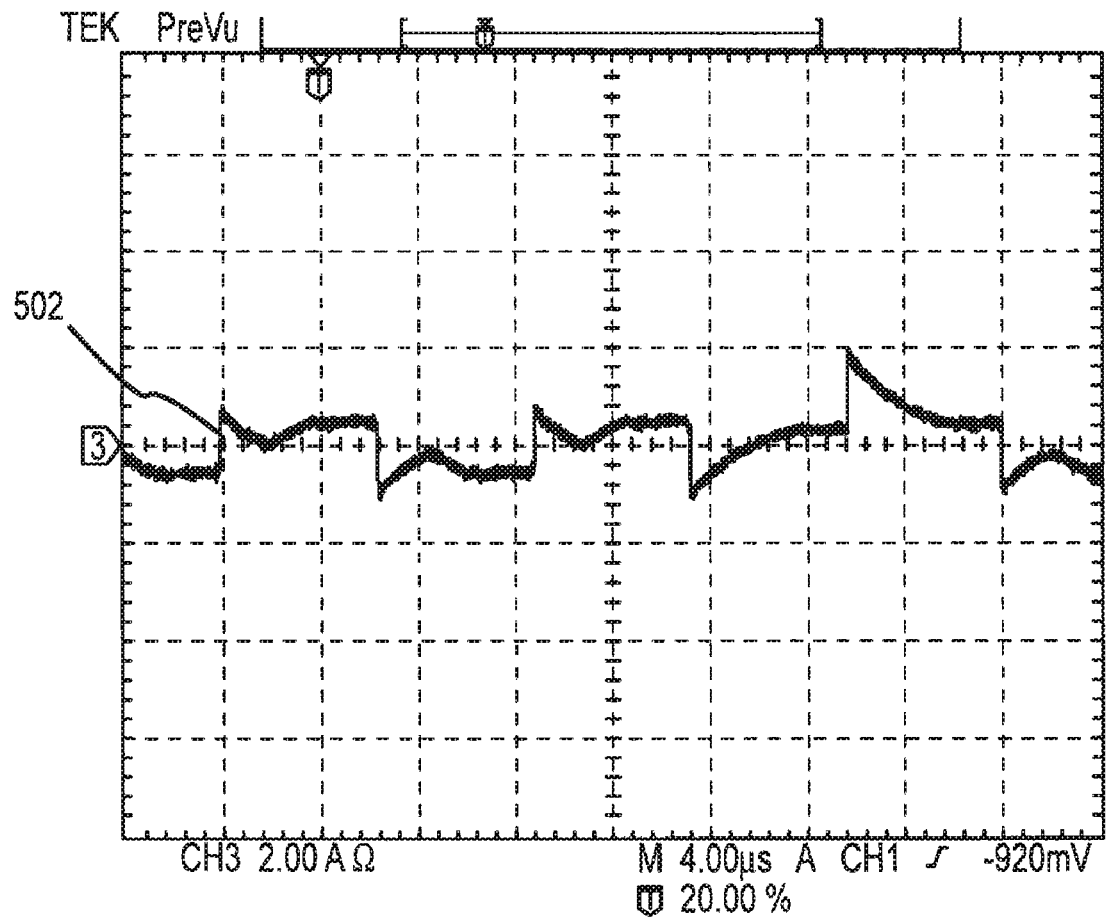

FIGS. 7A-7C are graphs illustrating exemplary waveforms during a burst mode with the DC/DC converter 400. In this embodiment, the DC/DC converter 400 was configured with a 3 W preload and 1 Ohm resistors for the load elements 401 and 402. FIG. 7A shows the differential voltage 500 between the MOSFETs 106 and 112 as they turn on and off. FIG. 7B shows the electric current through the clamp diode 109 via voltage waveform 501. FIG. 7C shows the electric current through the resonant inductor 107. The phase between the full-bridge legs (i.e., one leg being the MOSFETs 105 and 112 with the other leg being the MOSFETs 110 and 106) jumps between about 150° and 0° in no-load burst mode. Immediately following the phase change, the current through the clamp diode 109 takes nearly a full half-cycle to reset (e.g., at 80 kHz, roughly 6.25 μs minus 300 ns for the resonant switching time, or roughly 5.95 μs), leaving relatively little margin for reset (e.g., roughly 4.24 μs) considering that the time to reset varies with circuit parameters and operating temperature.

Figure 8A:
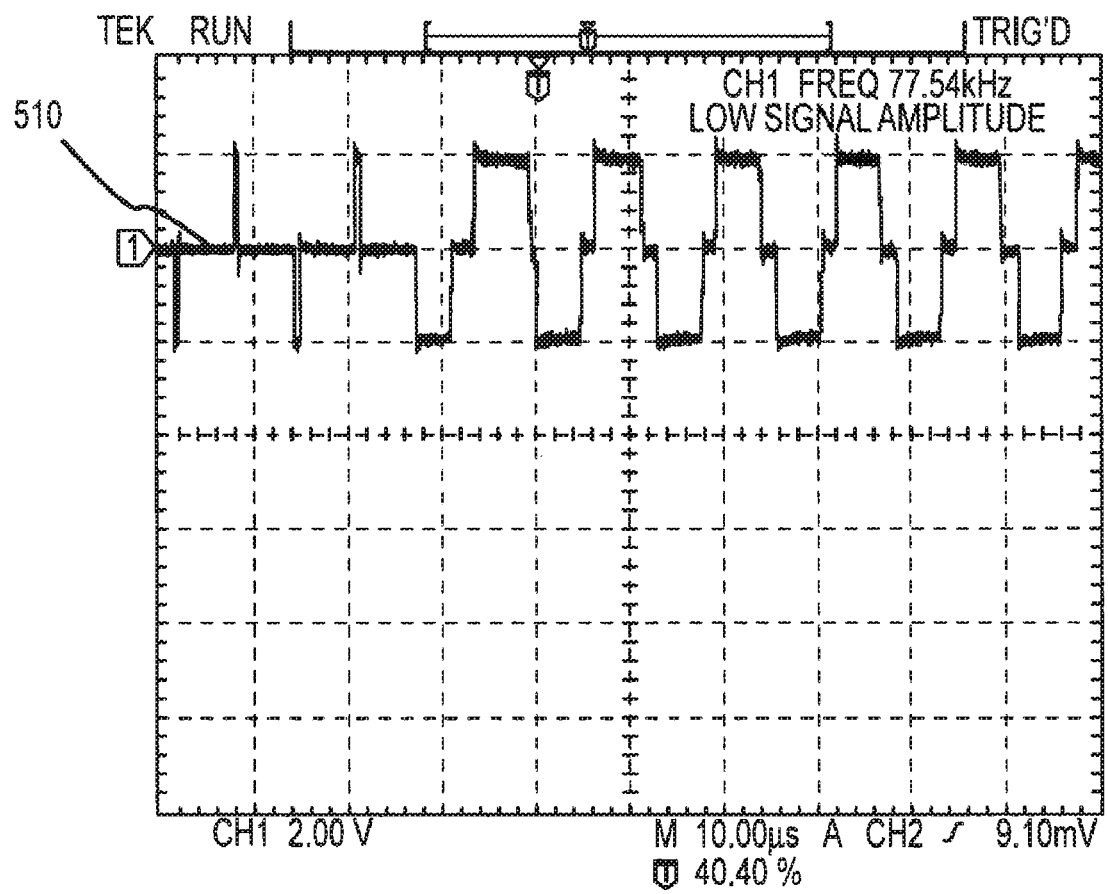
FIGS. 8A-8C are graphs illustrating exemplary waveforms also during a burst mode of the DC/DC converter of FIG. 4.
Figure 8B:
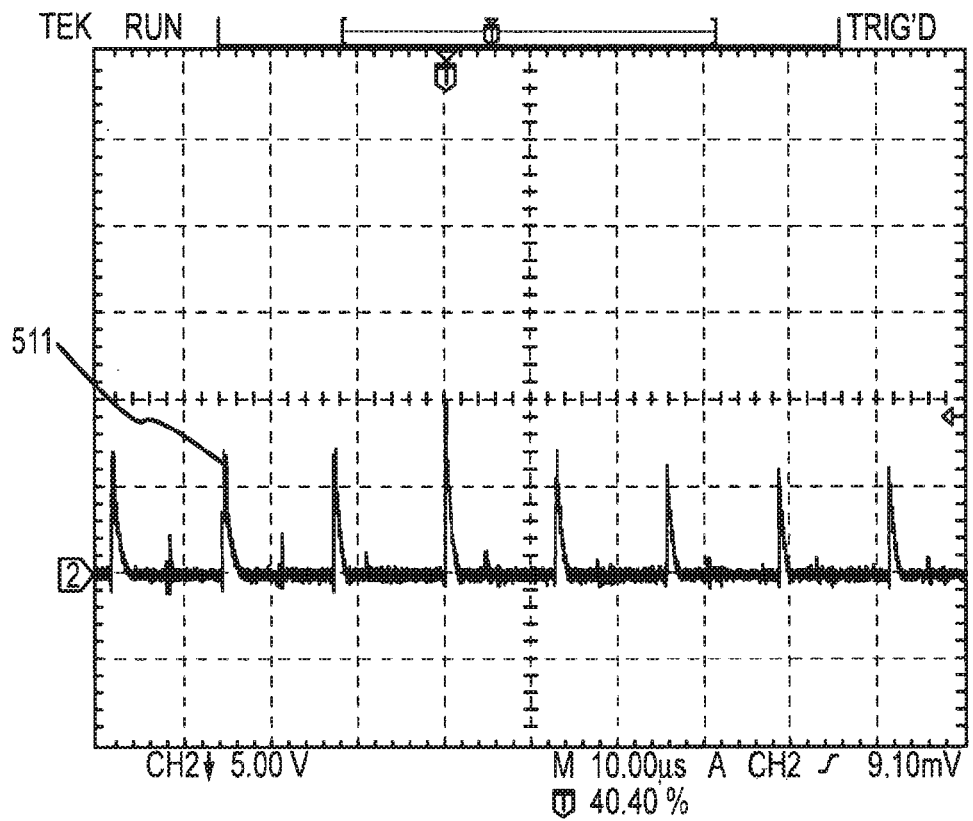
Figure 8C:
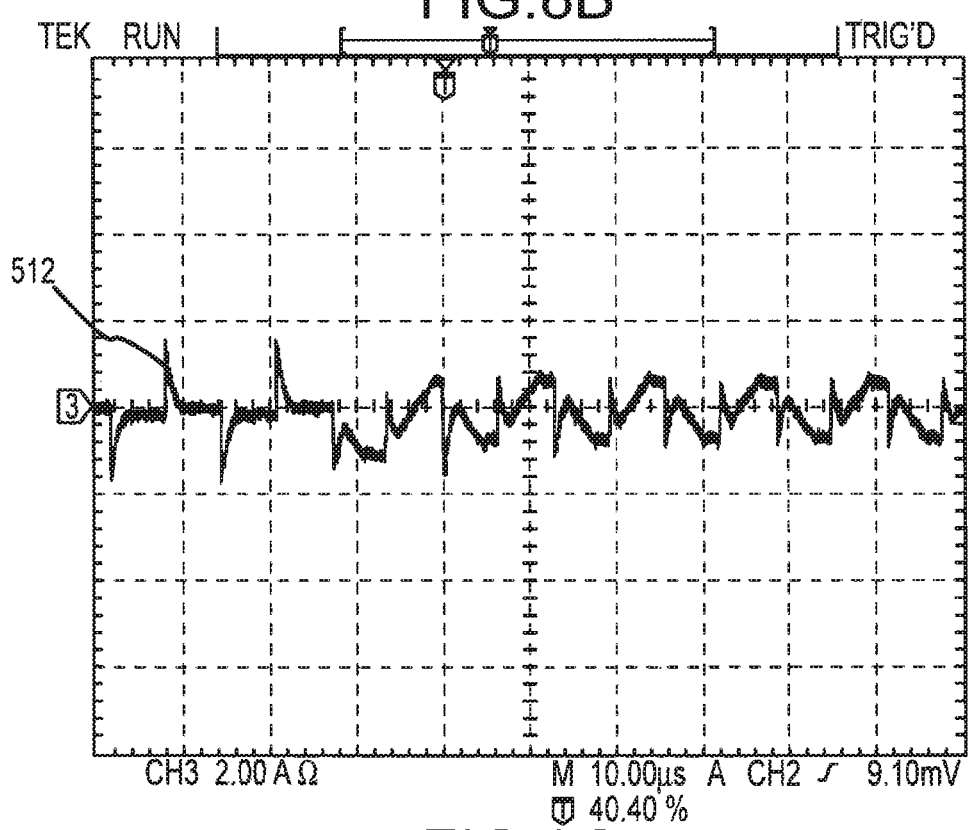

The waveforms of FIGS. 8A-8C correspond to the waveforms of FIGS. 7A-7C in that the waveforms were obtained from the same locations on the DC/DC converter 400. FIGS. 8A-8C, on the other hand, show significant reset during a no-load burst mode in which the DC/DC converter 400 is configured with a 3 W preload and 4.7 Ohm resistors in series with the clamp diodes 108 and 109. For example, the 4.7 Ohm resistors damp the electric current flowing through the clamp diodes 108 and 109 (e.g., in approximately 2 μs to provide significant margin when compared to the roughly 5.95 μs of the 1 Ohm resistor embodiment in FIG. 7.

Figure 9:
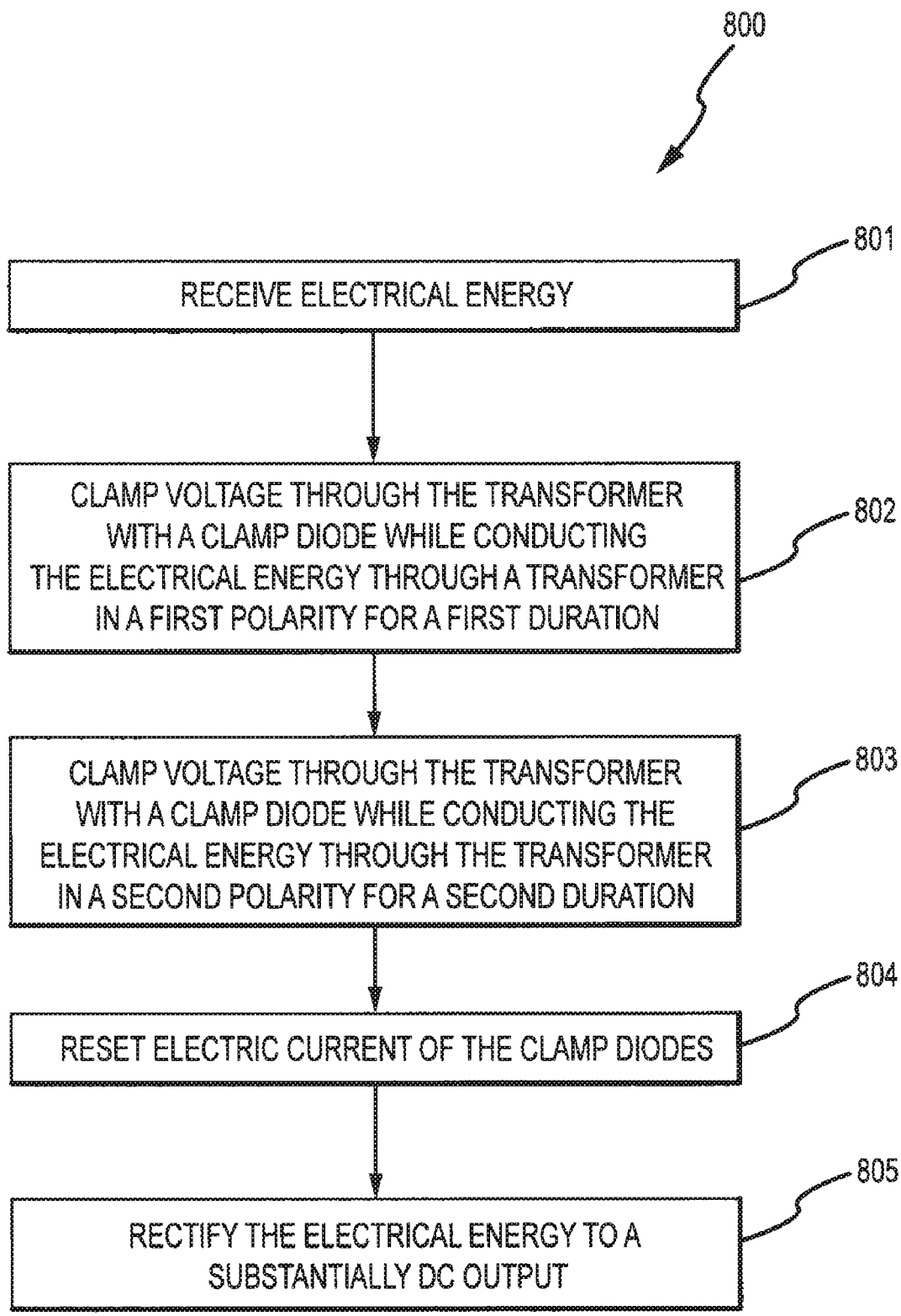
FIG. 9 is a flowchart illustrating an exemplary process of the DC/DC converter of FIG. 4.

FIG. 9 is a flowchart illustrating an exemplary process 800 of the DC/DC converter 400 of FIG. 4. The DC/DC converter 400 receives electrical energy in the process element 801. This electrical energy is switched through a transformer in alternating polarities (e.g., first and second polarities). While this electrical energy is being conducted through the transformer, the voltage through the transformer is being clamped by clamp diodes in the process elements 802 and 803. A full load to no load transient, however, may increase a voltage through a resonant inductor of the DC/DC converter and potentially cause the clamp diodes to fail. To prevent the clamp diodes from failing, the electric current through the clamp diodes is reset by providing a load element in series with the clamp diodes, in the process element 804. For example, resistors having values between about 100 milli-Ohms and 100 Ohms may be placed in series with the clamp diodes. Such resistors may have the effect of resetting the current through the clamp diodes more quickly without substantial preload being configured with the DC/DC converter 400. The energy conducted through the transformer is then rectified to provide a substantially DC output from the DC/DC converter 400, in the process element 805.

Figure 10:
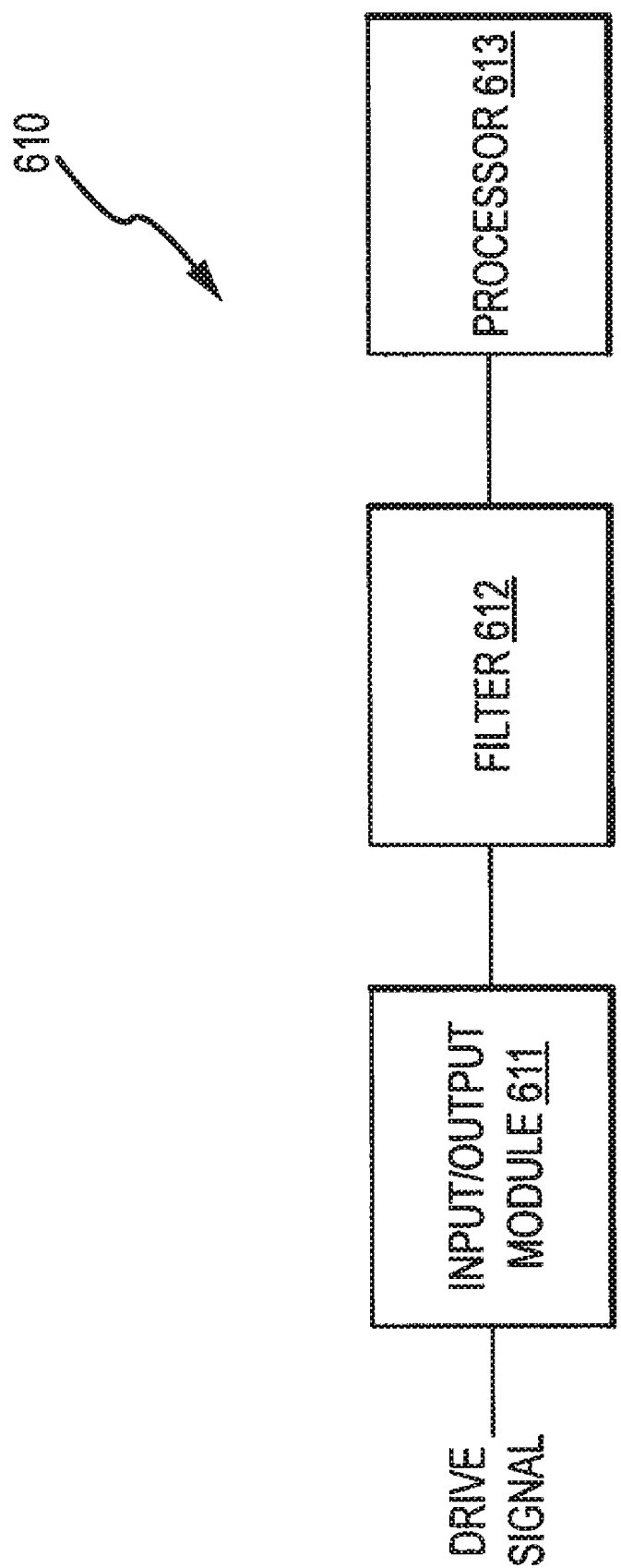
FIG. 10 is a block diagram of an exemplary detection system which may be configured with a switched mode power supply, such as the DC/DC converter FIG. 4.

FIG. 10 is a block diagram of an exemplary detection system 610 which may be configured with a switched mode power supply, such as the DC/DC converter 400 of FIG. 4, to detect a power outage. For example, switched mode power supplies commonly use pulse width modulation (PWM) of power and semiconductor switches to convert one voltage (e.g., the input voltage) to another voltage (e.g., the output voltage). If the power supply operates in regulation, then the PWM duty cycle of the semiconductor switch generally contains information about the input voltage. In cases of electric-current-mode control power supplies, the information about input voltage contained within the duty cycle generally only lags an actual change in DC voltage by a single PWM cycle (e.g., on the order of microseconds). Accordingly, when an AC outage occurs, the DC voltage on the input side of the supply begins to drop. This DC voltage drop on the input side of the supply is directly related to a "holdup time" of the power supply. However, those skilled in the art should readily recognize that the detection system 610 is not intended to be limited to configuration with the DC/DC converter of FIG. 4. Rather, the inventive concepts associated with the detection system 610 are only included herein to describe one exemplary implementation of the detection system. The detection system 610 could be configured with other types of switched mode power supplies and/or the associated components or even to other types of circuits. An example of such an implementation may regard the configuration of the detection system 610 with the multi-phase power supply controller described in U.S. Patent Application Number 20070132508. Moreover, the detection system 610 may be configured with other types of switching devices where outage detection is deemed necessary.

The detection system 610 may include an input/output module 611 that is configured to receive one or more gate drive signals (e.g., the control signals $CTL_1$, $CTL_2$, $CTL3_1$, and $CTL_4$) that are used to drive the semiconductor switches of the switched mode power supply (e.g., the MOSFETs 105, 106, 110, and 112 hereinabove). For example, the input/output module 611 may convert the gate drive signals to the inverse of an equivalent single gate drive signal. The detection system 610 may also include a method for combining the gate drive signals into a single equivalent gate drive signal and may also include a filter 612 that filters the gate drive signals. For example, the PWM frequency is typically much faster than the speed of the AC input line. By filtering a PWM gate drive signal of a power supply with the filter 611, the level of the DC voltage at the input side of the supply can be indirectly determined. That is, when the input DC voltage falls low enough that the power supply is no longer able to regulate its voltage, the PWM duty cycle of the gate drive signal generally has a maximum duty cycle for the PWM controller. The filtered inverse of the equivalent single gate drive signal may then be transferred to the processor 613 to determine whether the AC outage has occurred. For example, if the maximum duty cycle of the PWM gate drive signal is close to 100%, then the filtered version of the inverse of the gate-drive logic approaches zero when the DC input voltage falls to the point where the power supply goes out of regulation. In this regard, the processor 613 may include a comparator 655 to compare the voltage of the filtered signal to a reference signal CMPR.

Additionally, it may be necessary to distinguish between AC outages and load transients that cause the input DC bus voltage to decrease. For example, when a load transient occurs, the comparator 655 level for the outage detection is temporarily decreased so as not to cause false trips in the detector. To adjust the comparator 655 level, it may be necessary to obtain a signal proportional to load current. Such a signal is often present in power supplies due to the need for current limiting. The signal may then be transferred through a high-pass filter and added to the comparator 655 level. The speed of the high-pass filter generally depends on the compensation loop of the converter, and should imitate the compensation loop speed. Typically, a first-order high-pass filter (e.g., formed by a single resistor and capacitor) is adequate. In the case of the converter used in experiments, the microcontroller (e.g., processor 654) already had a signal proportional to load current, so it was capable of determining the effect of load transients with no additional circuitry. The microcontroller was capable of implementing the comparator and the high-pass filter digitally. Additionally, the microcontroller may adjust and intermediate bus voltage reference.

Certain advantages exist by filtering the inverse gate drive signal. For example, many methods of AC outage detection directly sense the AC voltage such that an AC outage may be quickly determined. In this regard, AC outage detection schemes often employ complex algorithms implemented with DSPs to determine an outage within approximately a quarter of a 60 Hz cycle (~4 ms). Other methods use the zero-crossing of the AC line to determine when there is no longer any AC voltage. However, the most accurate of the faster methods are generally expensive and require additional components and firmware development. By filtering the inverse gate drive signal, on the other hand, less complex circuitry may be implemented. For example, in one embodiment, the detection system 610 may be implemented on a phase-shifted full-bridge converter with as little as 6 signal-level Schottky diodes, 5 resistors, and 2 capacitors, as shown below in FIG. 11. The Schottky diodes and 2 resistors may be used to generate an inverse of the gate drive signals and the remaining 3 resistors and 2 capacitors may be used to form a high pass filter that filters the inverse of the gate drive signals.

Alternatively, a processor may be used to generate an inverse of the gate drive signals. Additionally, a substantial signal gain may be noticed in the filtering of the inverse gate drive signal as compared to the DC input voltage. Moreover, the gate drive signal may be referenced to a common circuit point to essentially eliminate the need for isolation.

Figure 11:
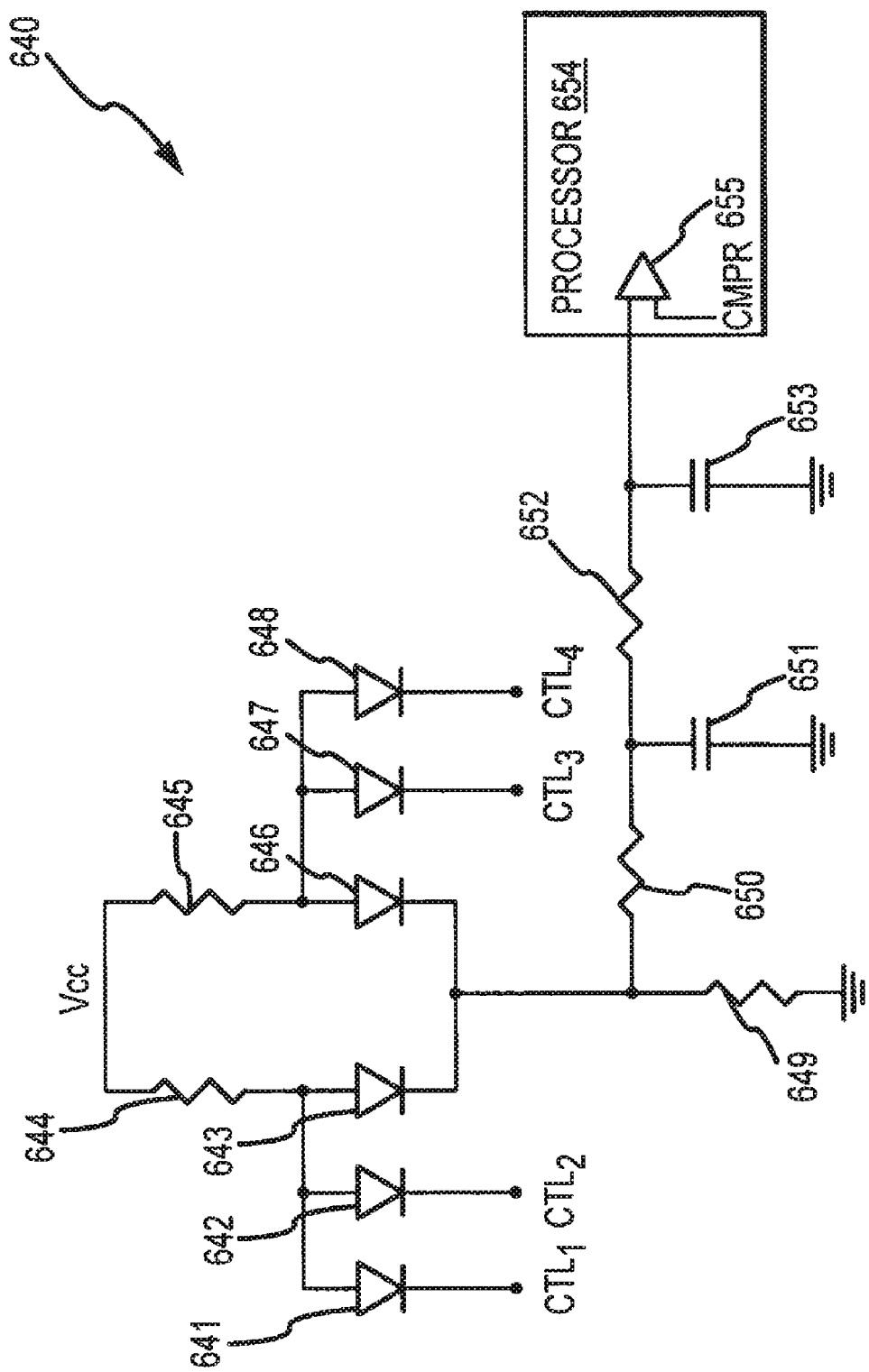
FIG. 11 is a circuit diagram of another exemplary detection system which may be configured with a switched mode power supply.

FIG. 11 is circuit diagram of another exemplary detection system 640 which may be configured with a switched mode power supply, such as the DC/DC converter 400 of FIG. 4, to detect a power outage thereof. In this embodiment, the diodes 641, 642, 647, and 648 are configured to receive the control signals $CTL_1$, $CTL_2$, $CTL_3$, and $CTL_4$, such as those used to control the switching of the active states of the DC/DC converter 400 (e.g., switching between the full-bridge legs of the converter with one leg including the MOSFETs 105 and 112 and the other leg including the MOSFETs 110 and 106) as well as the passive states of the DC/DC converter 400, as described hereinabove. In this regard, both the active states and the passive states may produce PWM signals that hold the diodes 641, 642, 647, and 648 in a reversed biased mode for at least some period of time. The diodes 643 and 645 may, in essence, monitor those control signals in a manner similar to the diode 623 of FIG. 10. That is, the electric current through the diodes 643 and 645 generally has a larger magnitude when the diodes 641, 642, 647, and 648 are turned off based on the voltage Vcc and the resistors 644 and 645. In one specific embodiment, the resistors 644 and 645 are 4.75 kOhm resistors having a voltage of about 2 V supplied thereto to generate electric current through the diodes 643 and 646. Each of the diodes 641, 642, 643, 646, 647, and 648 may be configured as Schottky diodes, thereby providing a relatively inexpensive means for detecting signal loss and generating control signals therefrom, particularly when compared to the DSP alternatives. Those skilled in the art, however, should readily recognize that a processor (e.g., a signal processor) may be configured with the detection system 640 in place of the diodes 641, 642, 643, 646, 647, and 648 so as to provide a logical inverse of the gate drive signals.

The electric current signal through the diodes 643 and 646 may then be coupled to a filter section that includes the resistors 649, 650, and 652 and the capacitors 651 and 653. In this embodiment, the filter section is generally configured with a frequency response based on the frequencies the PWM signals (although other configurations may be employed depending on the signal characteristic being monitored) such that the operational status of the DC/DC converter 400 may be determined. For example, the filter section may be a high pass filter that takes into account both the passive and active states of the DC/DC converter 400. In one specific embodiment for a phase-shifted full-bridge converter operating at 100 kHz, the resistors 649 is a 22.1 kOhm resistor, the resistor 650 is a 100 kOhm resistor, and the resistor 652 is a 1 MOhm resistor. Additionally, the capacitor 651 is a 2.7 µF capacitor and the capacitor 653 is a 330 pF capacitor.

When the DC/DC converter 400 experiences a power outage, the control signals $CTL_1$, $CTL_2$, $CTL_3$, and $CTL_4$ may diminish or no longer exist such that the diodes 641, 642, 647, and 648 are turned on. The voltage at the processor 654 may ultimately decrease thereby enabling the processor 654 to determine that an AC power outage has occurred. Such detection is generally faster than monitoring the output voltage or even the input voltage of the DC/DC converter 400, as can be seen in FIGS. 12A-12C.

Figure 12A:
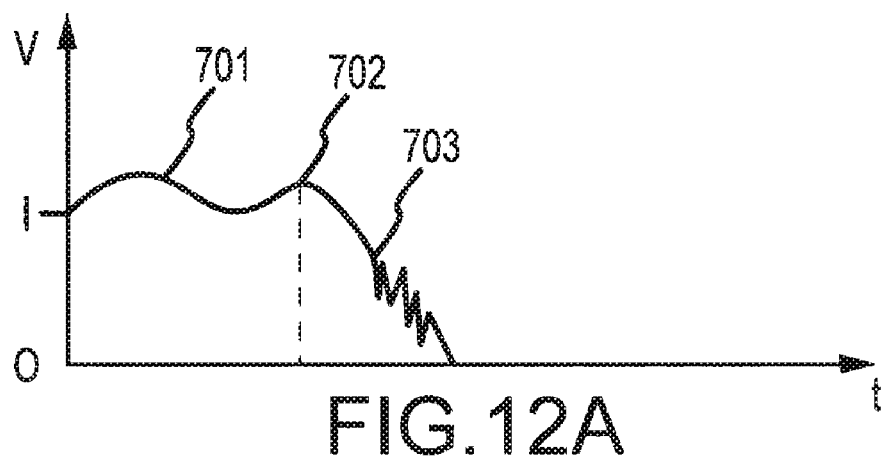
FIGS. 12A-12C are graphs illustrating the advantages of a detection system by means of various waveforms.
Figure 12B:
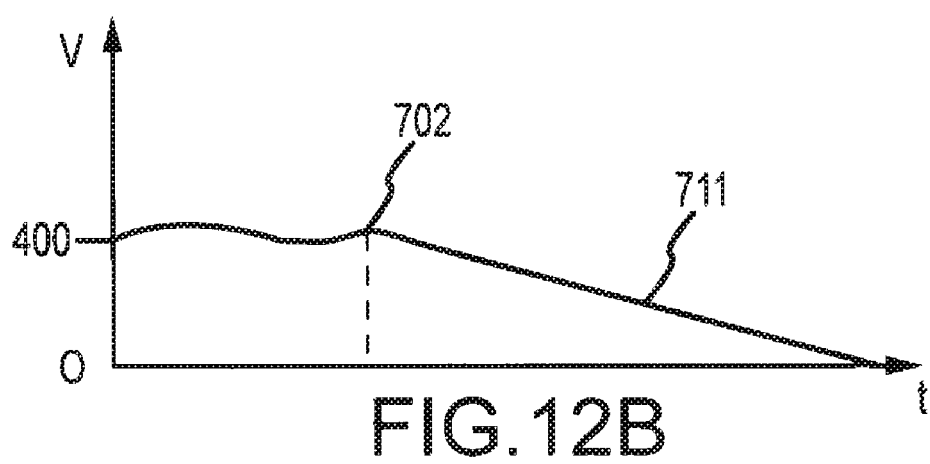
Figure 12C:
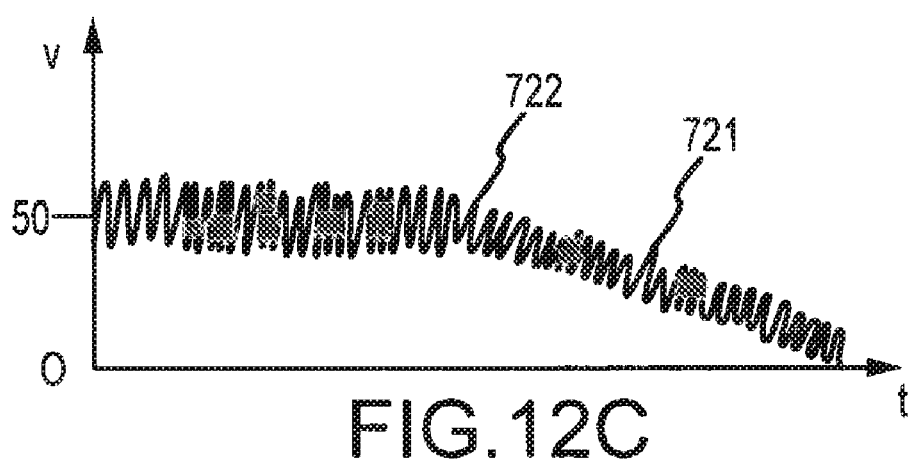

FIG. 12A illustrates the output from the detection system 640 when configured with the DC/DC converter 400 during an AC power outage. The waveform 701 corresponds to the voltage that is output from the filter section of the detection system 640. At the time 702, the voltage on the waveform 701 begins to drop, in this case resulting from an AC power outage to the DC/DC converter 400. At the time 703, roughly 2 ms after the AC power outage occurs, the detection system 640 may detect the AC power outage. Conversely, by monitoring the DC input to the DC/DC converter 400 (e.g., from a 400 V bus), the power outage at the time 702 is barely noticeable as the voltage waveform 711 of FIG. 12B decreases over a substantially longer period of time. And, the relatively noisy waveform 721 of the voltage output of the DC/DC converter 400 illustrated in FIG. 12C is generally not even useful in detecting a power outage until well after the AC power outage occurs (e.g., at the time 722) due to the holdup time of the converter.

Figure 13:
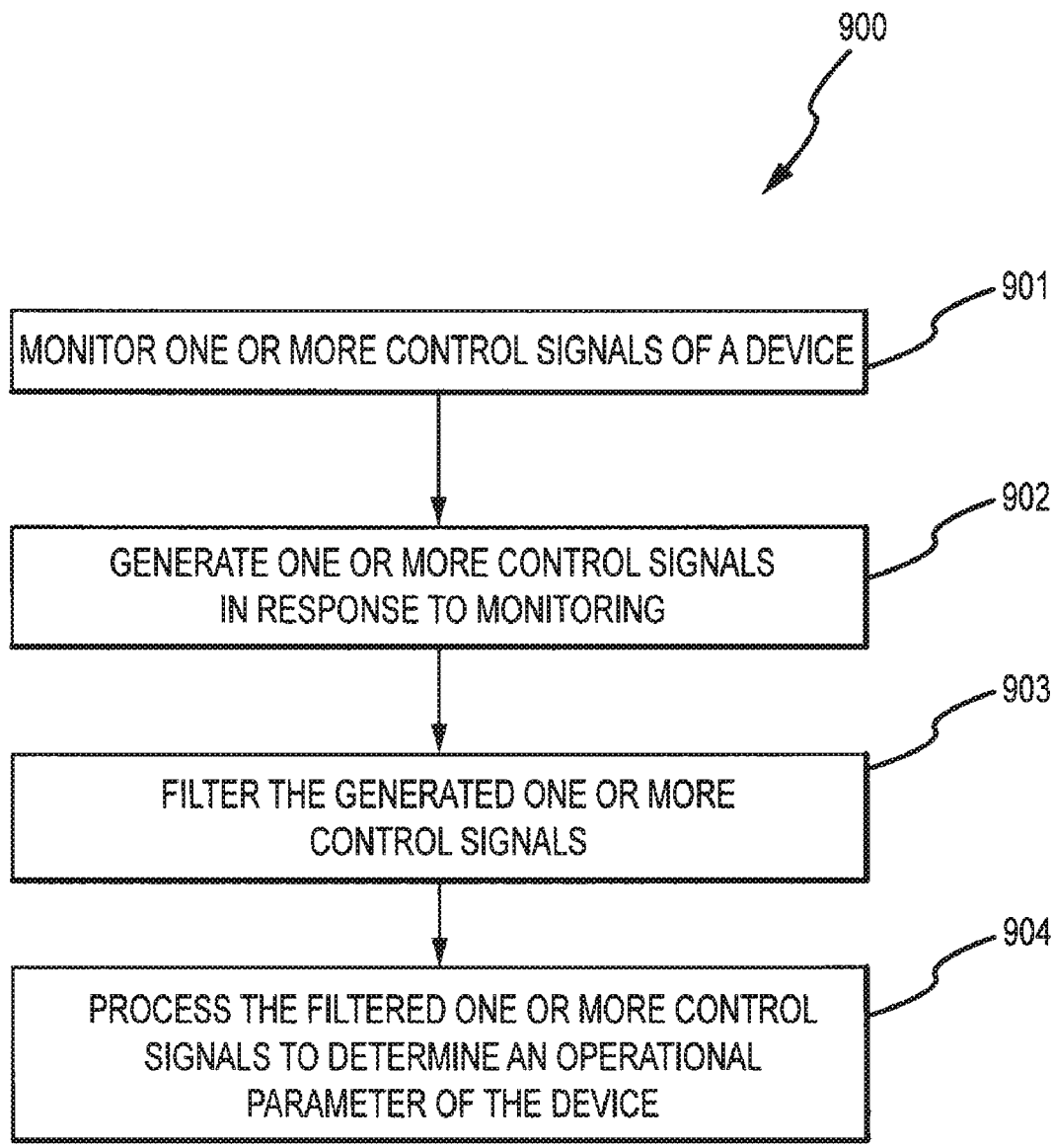
FIG. 13 is a flowchart illustrating an exemplary process of a detection system.

FIG. 13 is a flowchart illustrating an exemplary process 900 of a detection system, such as the detection system 640 of FIG. 11. The detection system may be used to determine AC power outages in any switched mode power supply that uses pulse-width-modulation control, such as the DC/DC converter 400 FIG. 4. In this regard, the detection system may monitor one or more control signals of a device, in the process element 901. The detection system generates one or more control signals in his response to monitoring the control signals of the device, in the process element 902. For example, the detection system may monitor gate drive signals of a switched mode power supply and generate one or more control signals indicative of their states. The generated control signals are then filtered in the process element 903 to remove, or smooth, any transients associated with the device control signals. For example, the gate drive signals may be pulse width modulated. While these gate drive signals are operational, the off times of the signals may be smoothed to provide a somewhat constant voltage. If, however, the gate drive signals have either ceased completely or reduced a duty cycle so as to bring the switched mode power supply out of regulation, the filtered control signals may indicate such by a sharp decrease in voltage. In this regard, the filtered control signals may indicate a power outage to the switched mode power supply. Accordingly, the filtered control signals are processed to determine an operational parameter of the device (e.g., an AC power outage), in the process element 904.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. An apparatus for detecting a power outage in an input of a switched mode power supply (SMPS), the SMPS comprising a switch that is coupled to a winding of a magnetic device, and a control signal coupled to the switch and operative to selectively open and close the switch, the apparatus comprising:
a control signal detection module coupled to the control signal and operative to generate a detection signal dependent on the control signal; and
a processing module operative to receive the detection signal, and further operative to process the detection signal to detect a power outage in the input of the SMPS dependent on the detection signal, wherein the processing module includes:
a comparator operative to compare the detection signal with a reference signal;
a load transient detection module operative to detect transients in a load of the SMPS;
wherein the processing module is further operative to selectively adjust the reference signal dependent on an output of the load transient detection module.

2. The apparatus of claim 1, wherein the SMPS includes a DC/DC converter.

3. The apparatus of claim 1, wherein the switch includes a MOSFET, and wherein the control signal is a gate drive signal to the MOSFET.

4. The apparatus of claim 1, wherein the control signal detection module includes a filter module operative to filter one or more predetermined frequencies of the control signal.

5. The apparatus of claim 4, wherein the filter module includes a high-pass filter and the control signal includes a pulse width modulated (PWM) signal.

6. The apparatus of claim 1, wherein the control signal detection module includes a microprocessor.

7. The apparatus of claim 1, wherein the control signal detection module includes a diode coupled to the control signal.

8. The apparatus of claim 1, wherein the control signal is a gate drive signal to the switch, and wherein the detection signal is substantially a filtered inverse of the control signal.

9. The apparatus of claim 1, wherein the load transient detection module is operative to generate a load current signal substantially proportional to a load current of the SMPS, and wherein the processing module is operative to selectively adjust the reference signal dependent on the load current signal.

10. The apparatus of claim 9, further comprising a high-pass filter module operative to block relatively low frequency components of the load current signal.

11. The apparatus of claim 10, wherein at least one of the comparator and the high-pass filter module include a microprocessor.

12. The apparatus of claim 1, wherein the control signal detection module is operative to generate the detection signal by conducting electric current through a diode, wherein the conducting is responsive to on times of the control signal.

13. The apparatus of claim 1, wherein the control signal is a PWM signal, and wherein the control signal detection module is operative to detect a condition wherein the PWM signal has a duty cycle above a predetermined threshold.

14. An apparatus for detecting a power outage in an input of a switched mode power supply (SMPS), the SMPS comprising a switch that is coupled to a winding of a magnetic device, and a pulse width modulated (PWM) control signal coupled to a gate of the switch as a gate drive signal, the apparatus comprising:
a control signal detection module coupled to the control signal and operative to generate a detection signal dependent on the control signal, wherein the detection signal includes a filtered inverse of the control signal; and
a processing module operative to receive the detection signal, and further operative to process the detection signal to detect a power outage in the input of the SMPS by comparing the detection signal to a reference signal, wherein the processing module includes:
a load transient detection module operative to detect transients in a load of the SMPS;

wherein the processing module is further operative to selectively adjust the reference signal dependent on an output of the load transient detection module.

15. The apparatus of claim 14, wherein the SMPS includes a DC/DC converter.

16. The apparatus of claim 14, wherein the switch includes a MOSFET, and wherein the control signal is a gate drive signal to the MOSFET.

17. The apparatus of claim 14, wherein the control signal detection module includes a microprocessor.

18. The apparatus of claim 14, wherein the control signal detection module includes a diode coupled to the control signal.

19. An apparatus for detecting a power outage in a switched mode power supply (SMPS), the SMPS comprising a switch and a pulse width modulated (PWM) control signal coupled to a gate of the switch as a gate drive signal, the apparatus comprising:

control signal detection module coupled to the control signal and operative to generate a detection signal dependent on the control signal, wherein the detection signal includes a filtered inverse of the control signal;

a processing module operative to receive the detection signal, and further operative to process the detection signal to detect a power outage in the SMPS by comparing the detection signal to a reference signal; and a reference signal adjustment module operative to generate a load current signal that is substantially proportional to a load current of the SMPS, to apply a filter to the load current signal, and to adjust the reference signal dependent upon the filtered load current signal.

20. The apparatus of claim 19, wherein the SMPS includes a DC/DC converter.

21. The apparatus of claim 19, wherein the switch includes a MOSFET, and wherein the control signal is a gate drive signal to the MOSFET.

22. The apparatus of claim 19, wherein the control signal detection module includes a microprocessor.

23. The apparatus of claim 19, wherein the control signal detection module includes a diode coupled to the control signal.

* * * * *